(12) United States Patent
Mermiris et al.

(10) Patent No.: US 12,325,622 B2
(45) Date of Patent: Jun. 10, 2025

(54) GAS SUPPLY REFUELING FACILITY

(71) Applicant: Tritec Marine Ltd., Dunbarton (GB)

(72) Inventors: Georgios Mermiris, Scotland (GB); Jamie Roberts, Scotland (GB)

(73) Assignee: Tritec Marine Ltd., Clydebank (GB)

( * ) Notice: Subject to any disclaimer, the term of this patent is extended or adjusted under 35 U.S.C. 154(b) by 0 days.

(21) Appl. No.: 18/919,563

(22) Filed: Oct. 18, 2024

(65) Prior Publication Data

US 2025/0042716 A1    Feb. 6, 2025

Related U.S. Application Data

(63) Continuation of application No. 17/805,495, filed on Jun. 6, 2022, now Pat. No. 12,122,662, which is a
(Continued)

(51) Int. Cl.
  *B63B 27/12*     (2006.01)
  *B60S 5/02*      (2006.01)
  (Continued)

(52) U.S. Cl.
  CPC .......... *B67D 9/00* (2013.01); *B60S 5/02* (2013.01); *B63B 17/0027* (2013.01);
  (Continued)

(58) Field of Classification Search
  CPC .................................................. B67D 9/00
  See application file for complete search history.

(56) References Cited

U.S. PATENT DOCUMENTS 3,863,460 A * 2/1975 Straile .............. F17C 3/025
                                                        62/53.2
4,075,860 A * 2/1978 Hansen ............. E02B 3/068
                                                        405/196
(Continued)

FOREIGN PATENT DOCUMENTS

CN       104960633 A      10/2015
CN       105570665 A       5/2016
(Continued)

OTHER PUBLICATIONS

European Patent Office, International Search Report and Search Report, PCT/IB2021/051276, May 3, 2021, 28 pages, Europe.
(Continued)

*Primary Examiner* — S. Joseph Morano
*Assistant Examiner* — Jovon E Hayes
(74) *Attorney, Agent, or Firm* — Haynes and Boone, LLP; Mark A. Tidwell

(57) ABSTRACT

A gas supply marine vessel and a refueling facility are described. The gas supply marine vessel includes a hull with an upper deck having an elongated cargo cavity formed therein. Gas interface modules are disposed in the cavity and extend between hull sides, each module having a plurality of fuel vessel docking stations. A plurality of stacked fuel container assemblies are fluidically coupled to the docking stations. A gantry, is movable along the length of the cavity, straddles the cargo cavity between hull sides. An articulating crane is mounted on the gantry and it utilized to move fuel container assemblies to a fuel container depression formed in the deck of a floating refueling facility. The floating refueling facility includes a concave side to facilitate mooring adjacent a shoreline, the concave side forming angled extensions at corners of the deck with a linkspan extending from each of the angled extensions.

30 Claims, 28 Drawing Sheets

Related U.S. Application Data continuation-in-part of application No. 17/006,653, filed on Aug. 28, 2020, now Pat. No. 11,352,250.

(60) Provisional application No. 63/008,377, filed on Apr. 10, 2020.

(51) Int. Cl.

| | | |
|---|---|---|
| *B63B 17/00* | (2006.01) | |
| *B63B 25/00* | (2006.01) | |
| *B63B 25/08* | (2006.01) | |
| *B63B 25/16* | (2006.01) | |
| *B63B 27/00* | (2006.01) | |
| *B67D 9/00* | (2010.01) | |
| *E04H 5/02* | (2006.01) | |
| *F17C 7/02* | (2006.01) | |
| *F17C 13/08* | (2006.01) | |
| *F17C 13/12* | (2006.01) | |
| *B63B 25/28* | (2006.01) | |

(52) U.S. Cl.
CPC ............ *B63B 25/004* (2013.01); *B63B 25/08* (2013.01); *B63B 25/16* (2013.01); *B63B 27/12* (2013.01); *B63B 27/19* (2020.05); *E04H 5/02* (2013.01); *F17C 7/02* (2013.01); *F17C 13/082* (2013.01); *F17C 13/126* (2013.01); *B63B 25/28* (2013.01); *F17C 2205/0107* (2013.01); *F17C 2205/0134* (2013.01); *F17C 2221/033* (2013.01); *F17C 2221/035* (2013.01); *F17C 2265/065* (2013.01); *F17C 2270/0105* (2013.01)

(56) References Cited

U.S. PATENT DOCUMENTS

| | | | | |
|---|---|---|---|---|
| 4,552,082 A | * | 11/1985 | Grey | .................... B63B 25/004 |
| | | | | 110/238 |
| 4,784,399 A | * | 11/1988 | Finn | ..................... F17C 13/085 |
| | | | | 410/48 |
| 5,368,184 A | | 11/1994 | Fay et al. | |
| 7,258,199 B2 | * | 8/2007 | Hayes, Sr. | .............. E04G 27/00 |
| | | | | 182/178.1 |
| 8,375,876 B2 | * | 2/2013 | Van Tassel | .............. B63B 25/16 |
| | | | | 114/74 R |
| 9,517,815 B1 | * | 12/2016 | Altman | .................... B63B 25/08 |
| 10,919,757 B1 | * | 2/2021 | Mermiris | .............. F17C 13/126 |
| 10,960,957 B1 | * | 3/2021 | Mermiris | .............. F17C 13/082 |
| 11,001,493 B1 | * | 5/2021 | Mermiris | .................. F17C 1/00 |
| 2005/0193938 A1 | | 9/2005 | Boatman et al. | |
| 2006/0162811 A1 | | 7/2006 | Roach | |
| 2012/0139274 A1 | | 6/2012 | Fleischer | |
| 2015/0344273 A1 | | 12/2015 | Kalkman | |
| 2016/0178127 A1 | * | 6/2016 | Oh | ........................... B60S 5/02 |
| | | | | 141/98 |
| 2016/0265720 A1 | | 9/2016 | Okuno et al. | |
| 2018/0312235 A1 | | 11/2018 | Xu et al. | |

FOREIGN PATENT DOCUMENTS

| | | |
|---|---|---|
| CN | 106542054 A | 3/2017 |
| CN | 107366829 A | 11/2017 |
| CN | 109969350 A | 7/2019 |
| DE | 2747865 A1 | 8/1997 |
| EP | 2098445 A1 | 9/2009 |
| JP | H 04242594 A | 8/1992 |
| KR | 100935643 B1 | 1/2010 |
| KR | 20130021926 A | 3/2013 |
| KR | 20130123929 A | 11/2013 |
| WO | WO 9729945 A1 | 5/1978 |

OTHER PUBLICATIONS

European Patent Office, International Search Report and Written Opinion, PCT/IB2020/058902, Apr. 20, 2021, 25 pages, Europe.
Preliminary Report on Patentability issued for International Patent Application No. PCT/IB2020/058902, dated Oct. 20, 2022, 19 pages, ISA:EP.

* cited by examiner

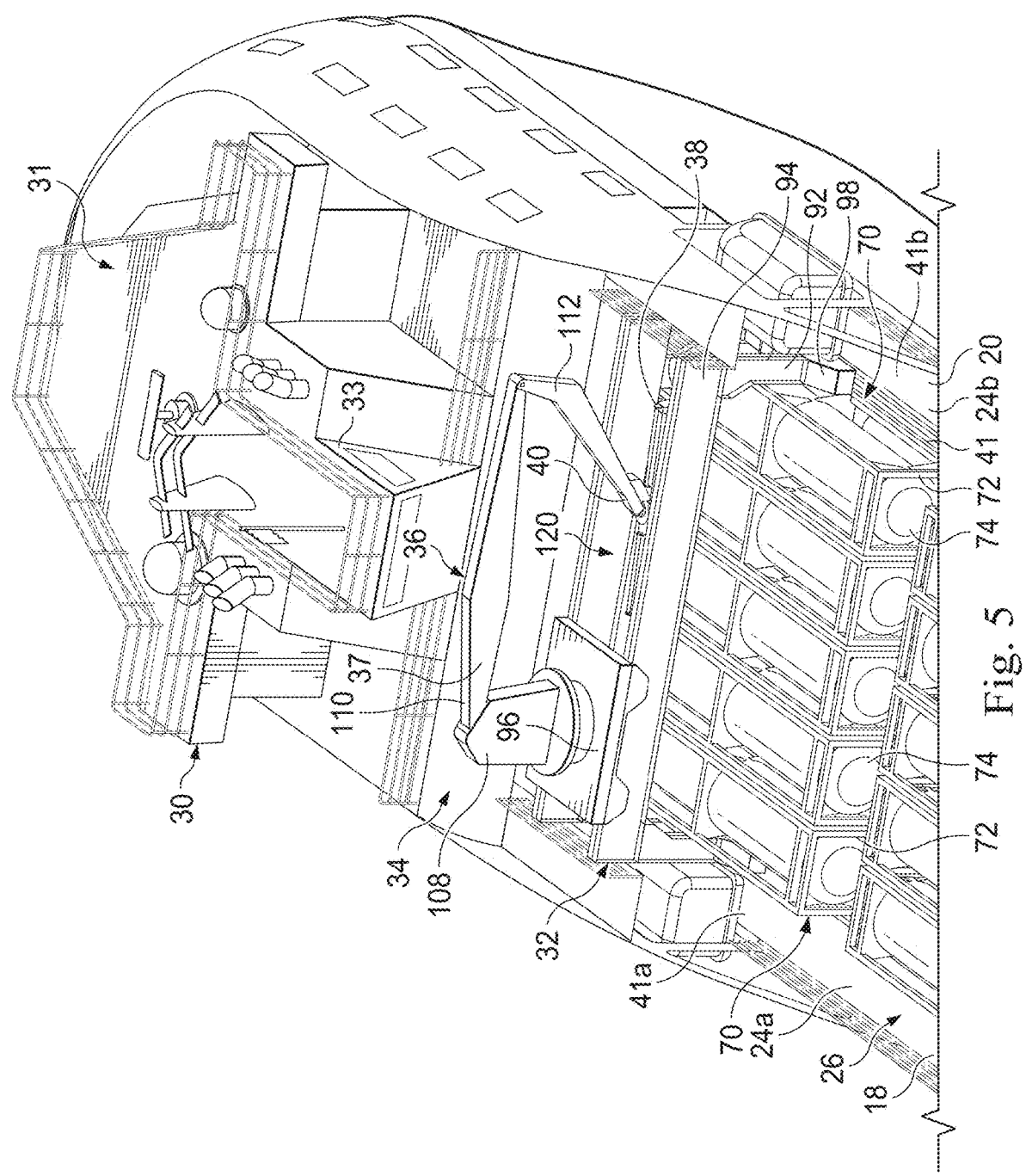

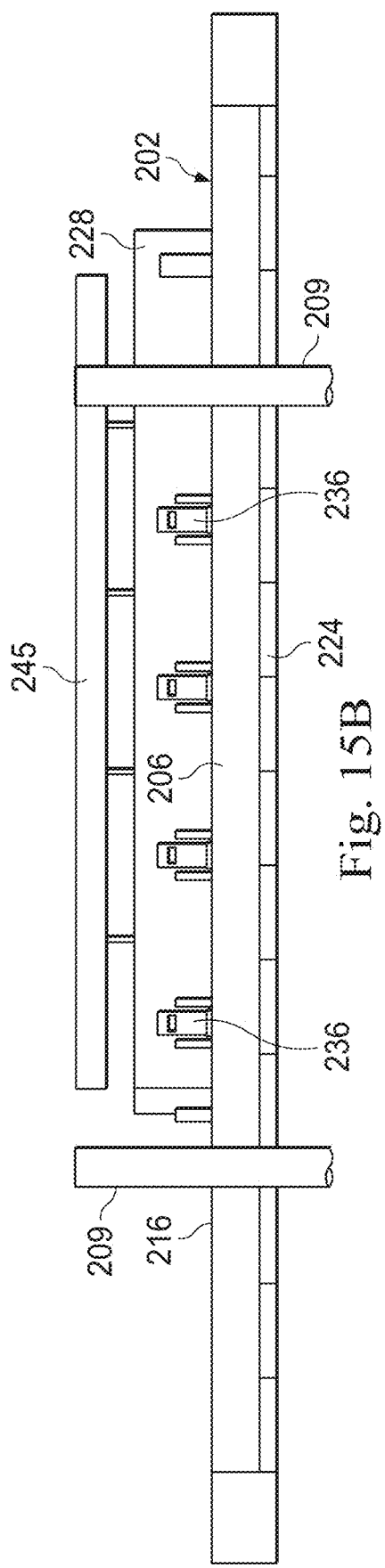
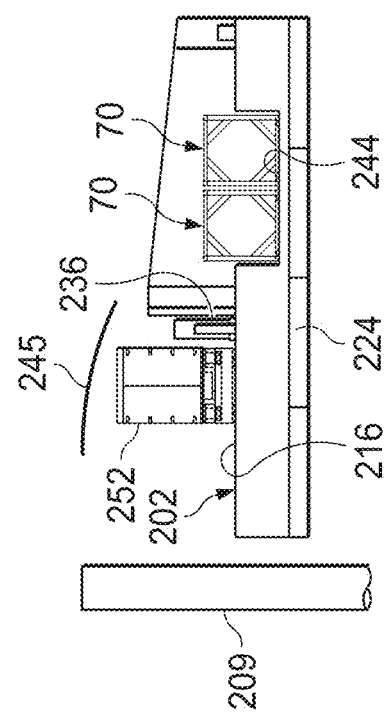

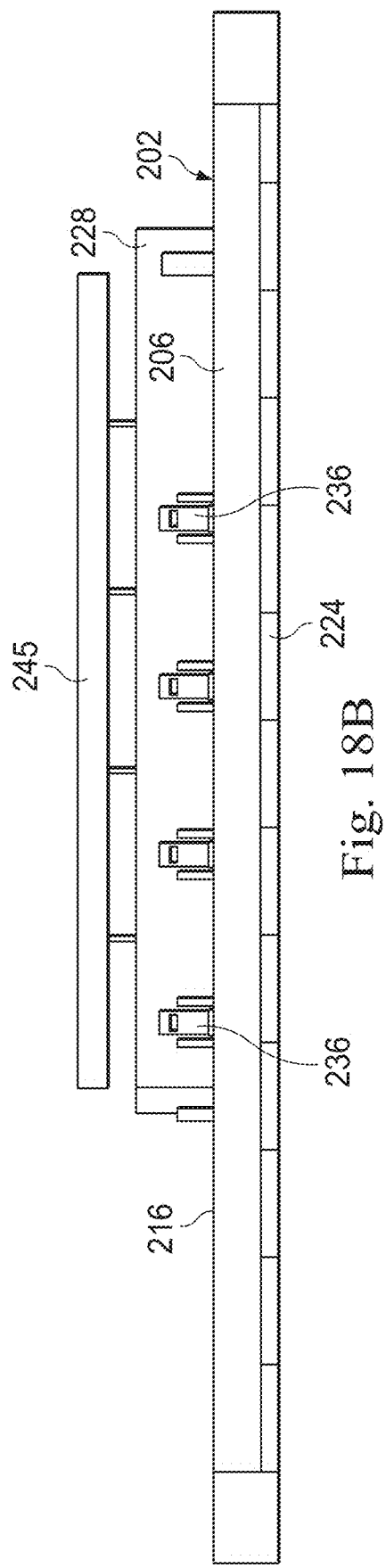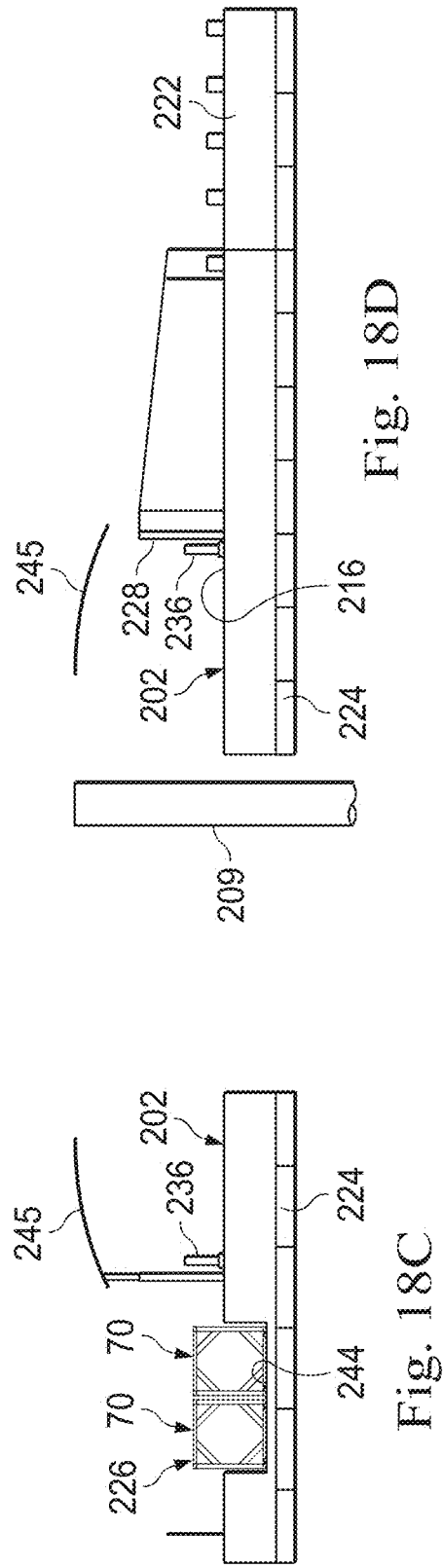

GAS SUPPLY REFUELING FACILITY

PRIORITY CLAIM

This application claims the benefit of priority to U.S. Non-Provisional application Ser. No. 17/805,495, filed Jun. 6, 2022, which claims the benefit of priority to U.S. Non-Provisional application Ser. No. 17/006,653, filed Aug. 28, 2020, which claims the benefit of priority to U.S. Provisional Application No. 63/008,377, filed Apr. 10, 2020, the benefit of which is claimed and the disclosures of which are incorporated by reference in their entirety.

FIELD OF THE INVENTION

The present disclosure generally relates to the delivery of natural gas by a marine vessel, and more particularly to a gas supply marine vessel and gas supply refueling facilities that permit the delivery of large volumes of natural gas to temporary or remote costal locations.

BACKGROUND OF THE INVENTION

It is well known that natural gas has a much lower carbon footprint than other fossil fuels, such as coal or oil. Thus, as the world strives to reduce the worldwide carbon footprint, the use of natural gas as a fuel has increased. One drawback to the use of natural gas as a fuel source is the difficulty of supply and storage. Typically, a steady supply of large volumes of natural gas requires installation of a pipeline to the point of use or storage. It is well known that pipelines can often take years to construct in the face of government regulations and right of way acquisition. Moreover, terrain may inhibit installation. Pipelines also require pumping stations and other infrastructure, as well as on-going monitoring and maintenance. As such, pipelines are particularly ill-suited for point of use or storage locations that may be temporary in nature or generally remote in location.

Thus, there is a need for a system to provide a steady supply of large amounts of natural gas to temporary or remote costal locations.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. Embodiments are described in detail hereinafter with reference to the accompanying figures, in which:

FIG. 4b is another perspective view of the gantry assembly of FIG. 4a.

FIG. 5 is a perspective view of the gantry assembly of FIGS. 4a and 4b installed on a gas supply marine vessel.

FIG. 15b is a cut-away end view of the floating refueling facility of FIG. 16a.

FIG. 15c is a side view of the floating refueling facility of FIG. 16a.

FIG. 18b is a cut-away end view of the floating refueling facility of FIG. 18a.

FIG. 18c is a side view of the floating refueling facility of FIG. 18a.

FIG. 18d is an end view of the floating refueling facility of FIG. 18a.

FIG. 19 is a perspective view of the floating refueling facility of FIG. 18a.

FIG. 20 is another perspective view of the floating refueling facility of FIG. 18a.

FIG. 21a is an overhead view of a gas supply marine vessel docked at the floating refueling facility of FIG. 19a.

FIG. 21b is a cut-away end view of gas supply marine vessel and floating refueling facility of FIG. 21a.

DETAILED DESCRIPTION OF THE DISCLOSURE

Disclosed herein is a gas supply marine vessel and various refueling facilities particularly suited for receiving the gas supply marine vessel, including a floating refueling facility and a land-based refueling facility. The gas supply marine vessel includes a buoyant, elongated hull with an upper deck having an elongated cargo cavity formed within the upper deck and a gantry assembly straddling the cargo cavity between hull sides and movable along the length of the cavity. An articulating crane is mounted on the gantry assembly and includes a boom with a first end pivotally attached to the gantry assembly and a spreader assembly attached to the second end of the boom, the articulating crane disposed to manipulate stackable fuel container assemblies disposed within the cavity. Also disposed within the cavity are one or more gas interface modules, each gas interface module having an elongated frame extending across the cargo cavity between first and second hull sides with each frame having a plurality of spaced apart fuel vessel docking stations disposed along the length of at least one frame side. A plurality of stackable fuel container assemblies are fluidically coupled to the gas interface module via the fuel vessel docking stations, all of which are in fluid communication with a manifold. The stackable fuel container assemblies are selectively attachable and removable from the gas interface module utilizing the gantry assembly and articulating crane. The floating refueling facility includes a floating deck with an upper deck surface extending between the sides and the ends of the deck with a first angled extension projecting away from one corner of the floating deck and a second angled extension projecting away from another corner of the deck. A fuel container depression is formed in the upper deck surface with an enclosure extending along at least a portion of the perimeter of the fuel container depression. Disposed within the depression are one or more gas interface modules, each gas interface module having an elongated frame with each frame having a plurality of spaced apart fuel vessel docking stations disposed along the length of at least one frame side. A plurality of stackable fuel container assemblies are positioned adjacent the gas interface module and fluidically coupled to the gas interface module via the fuel vessel docking stations, all of which are in fluid communication with a manifold. The stackable fuel container assemblies are selectively attachable and removable from the gas interface modules utilizing the gantry assembly and articulating crane carried by the gas supply marine vessel. The land-based refueling facility also includes a plurality of stacked fuel container assemblies fluidically coupled to a gas interface module.

Figure 1:
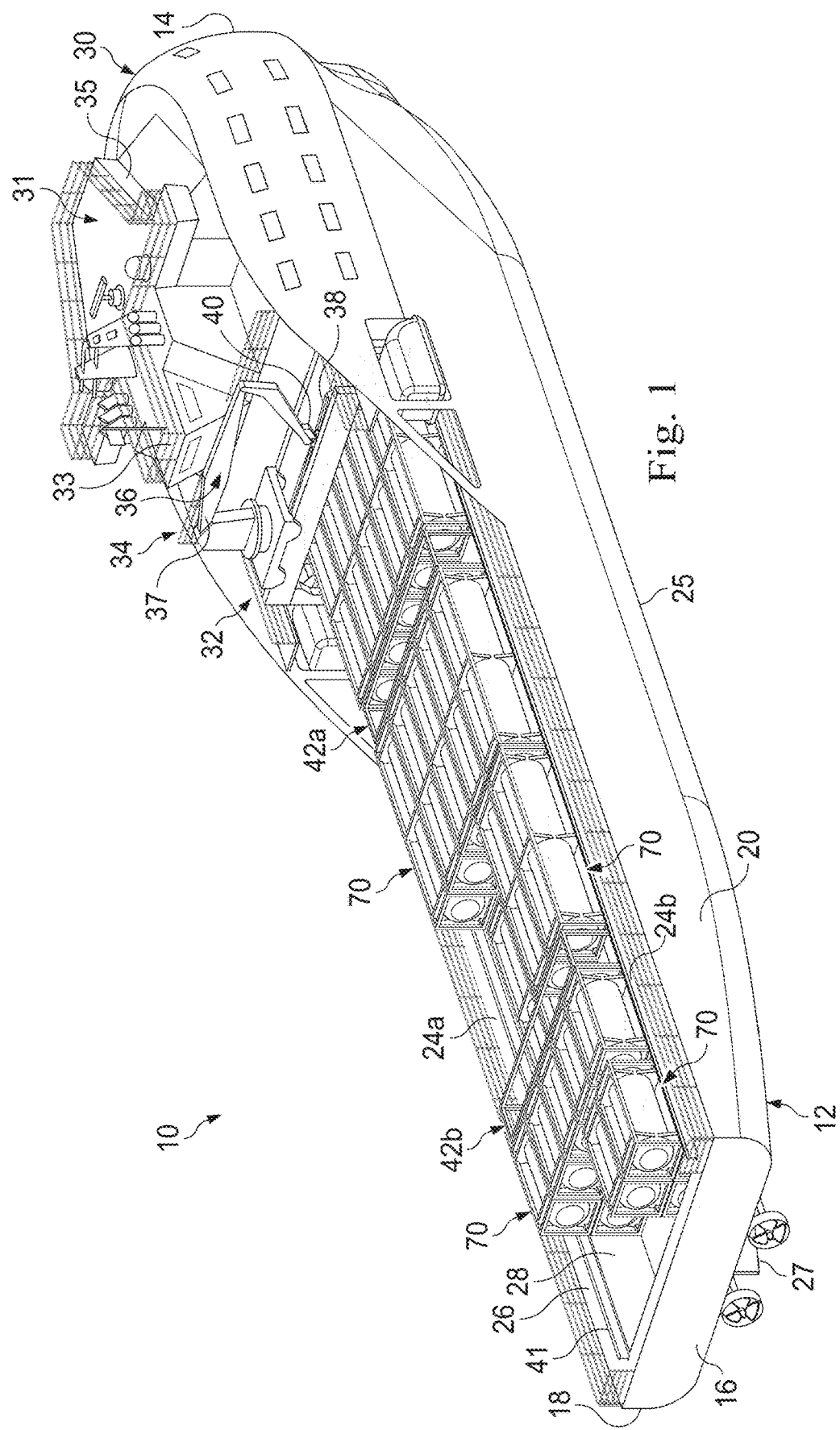
FIG. 1 is a perspective view from the stern of a gas supply marine vessel loaded with a plurality of stacked fuel container assemblies.
Figure 2:
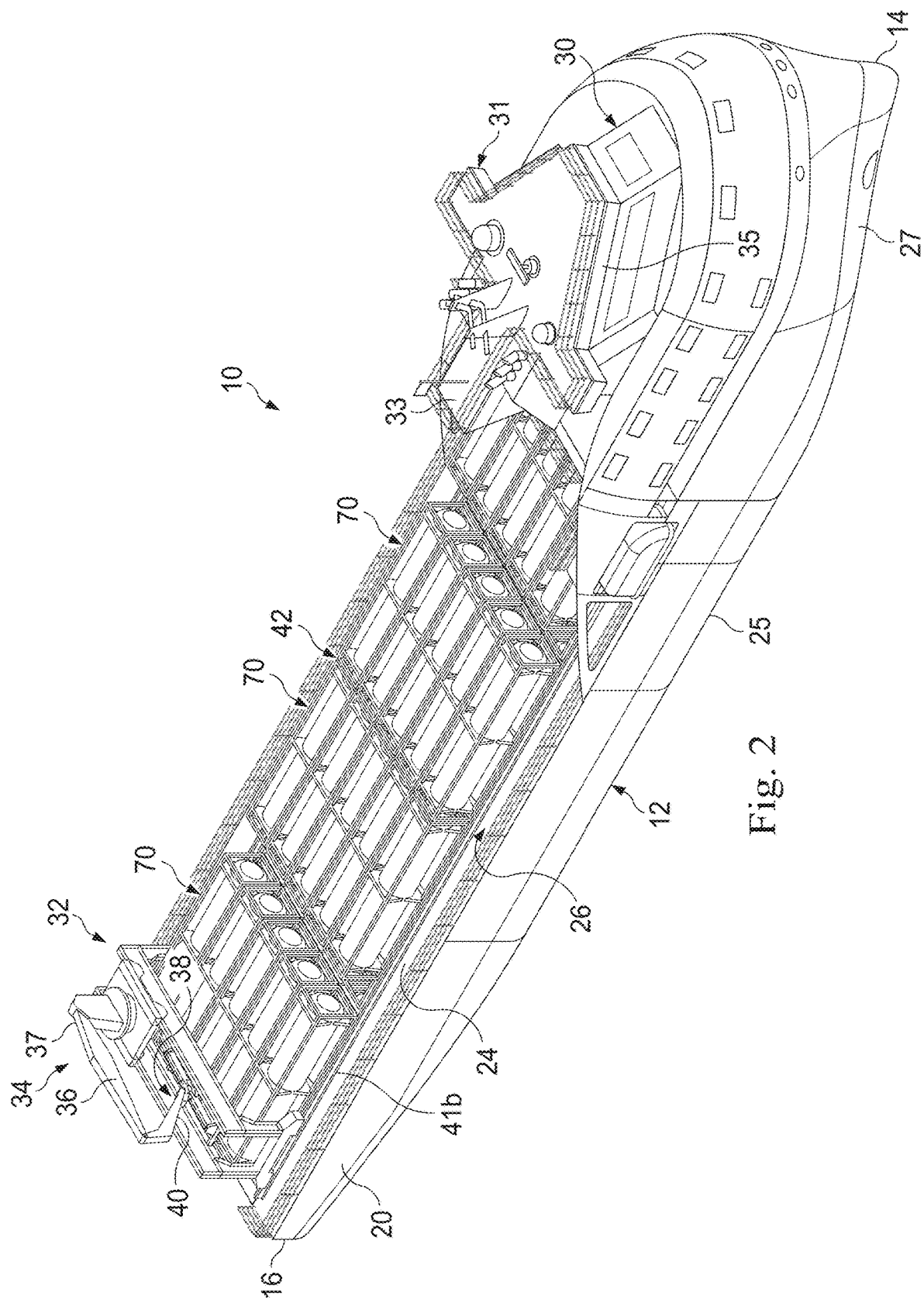
FIG. 2 is a perspective view from the bow of the gas supply marine vessel of FIG. 1.

With reference to FIGS. 1 and 2, a gas supply marine vessel 10 is shown. Gas supply marine vessel 10 includes a buoyant, elongated hull 12 having a first or bow end 14 and a second or stern end 16. Hull 12 is formed of a first hull side 18 and an opposing second hull side 20, each hull side having an upper edge 24, such that first hull side 18 has an upper edge 24a and second hull side has an upper edge 24b. In some embodiments, bottom 25 of hull 12 extending between the first end 14 and the second end 16 may have a keel 27, while in other embodiments, bottom 25 may be substantially flat. In one or more embodiments, bottom 25 may be shallow draft to allow vessel 10 approach the coast line of remote locations. An upper deck 26 extends between the hull sides 18, 20. Defined along upper deck 26 between hull sides 18, 20 is an elongated cargo area 28. In one or more embodiments, cargo area 28 is an elongated cargo cavity formed in upper deck 26 between hull sides 18, 20, with cargo cavity 28 having opposing cavity sides 29a, 29b (see FIG. 3) that are substantially parallel with hull sides 18, 20. In this regard, in cargo cavity 28 may be substantially rectangular extending along a major axis that is generally parallel with the centerline of the hull 12 and keel 27 and a minor axis extending between sides 18, 20. In one or more embodiments, cargo cavity 28 is open, while in other embodiments, cargo cavity 28 may include a temporary, movable or removable cover (not shown) to cover or at least partially enclose cargo cavity 28 when gas supply marine vessel 10 is moving between locations of call. In one or more embodiments, gas supply marine vessel 10 is a self-propelled boat that is generally movable under its own power, while in other embodiments, gas supply marine vessel 10 may be a barge, in which case, first end 14 and second end 16 substantially the same in shape.

In embodiments where gas supply marine vessel 10 is a boat, positioned at one end 14, 16 of the hull 12 and extending between the two hull sides 18, 20 is a multi-deck, enclosed accommodation structure 30. Accommodation structure 30 generally rises above upper deck 26 and may include a bridge 31 having a wheelhouse 35, as well as a crane control cabin 33 extending towards the opposite end 14, 16 and overlooking the cargo cavity 28.

A gantry assembly 32 straddles cargo cavity 28 between the two hull sides 18, 20. Gantry assembly 32 is movable relative to the two sides 18, 20 along at least a portion of the length of the hull 12. In one or more embodiments, gantry assembly 32 can translate at least the length of cavity 28.

An articulating crane 34 is mounted on the gantry assembly 32. Articulating crane 34 includes a boom 36 with a first end 37 pivotally attached to the gantry assembly 32 and a cargo engagement mechanism 38 attached to the second end 40 of the boom 36.

A track 41 may extent along at least a portion of the length of cargo cavity 28 to guide gantry assembly 32. In one or more embodiments, a track 41 may be provided on each side of cargo cavity 28. Each track 41 may be positioned between cavity sides 29a, 29b and the adjacent hull side 18, 20, respectively.

In some embodiments, one or more gas interface modules 42 are positioned in the cargo cavity 28. In other embodiments, a plurality of gas interface modules 42 are positioned in the cargo cavity 28. In the illustrated embodiment, two spaced apart gas interface modules 42a, 42b are shown. Gas interface module 42 will be explained below in more detail in FIG. 8. Gas interface module 42 may be permanently affixed within cargo cavity 28 or removably attached thereto. In one or more embodiments, as described below with respect to operation, gas supply marine vessel 10 need not include any gas interface module 42.

Each gas interface module 42 is disposed to be fluidically coupled to a plurality of fuel container assemblies 70 positioned adjacent the gas interface module 42. In the illustrated embodiment, each of a plurality of fuel container assemblies 70 is separately coupled to gas interface modules 42a, 42b. In one or more embodiments, fuel container assemblies 70 are stacked in columns and may be arranged adjacent one another in rows to form a set of fuel container assemblies 70, with each of a plurality of fuel container assemblies 70 in a set fluidically coupled separately to the gas interface module 42. In addition to being fluidically coupled, being adjacent the gas interface module 42, one or more of the fuel container assemblies 70 may also be attached or otherwise physically coupled to the gas interface module 42 to secure the fuel container assemblies 70 during transport.

In FIG. 1, two gas interface modules 42 are shown, with a first set 70a and a second set 70b of fuel container assemblies 70 fluidically coupled to gas interface module 42a and a third set 70c and a fourth set 70d of fuel container assemblies 70 fluidically coupled to gas interface module 42b. A fifth set 70e of fuel container assemblies 70 are stored on deck 26 but are not fluidically coupled to a gas interface module 42. In FIG. 2, fuel container sets 70a-70d are shown, but only second set 70b and third set 70c of fuel container assemblies 70 are shown fluidically coupled to a gas interface module 42.

Figure 3:
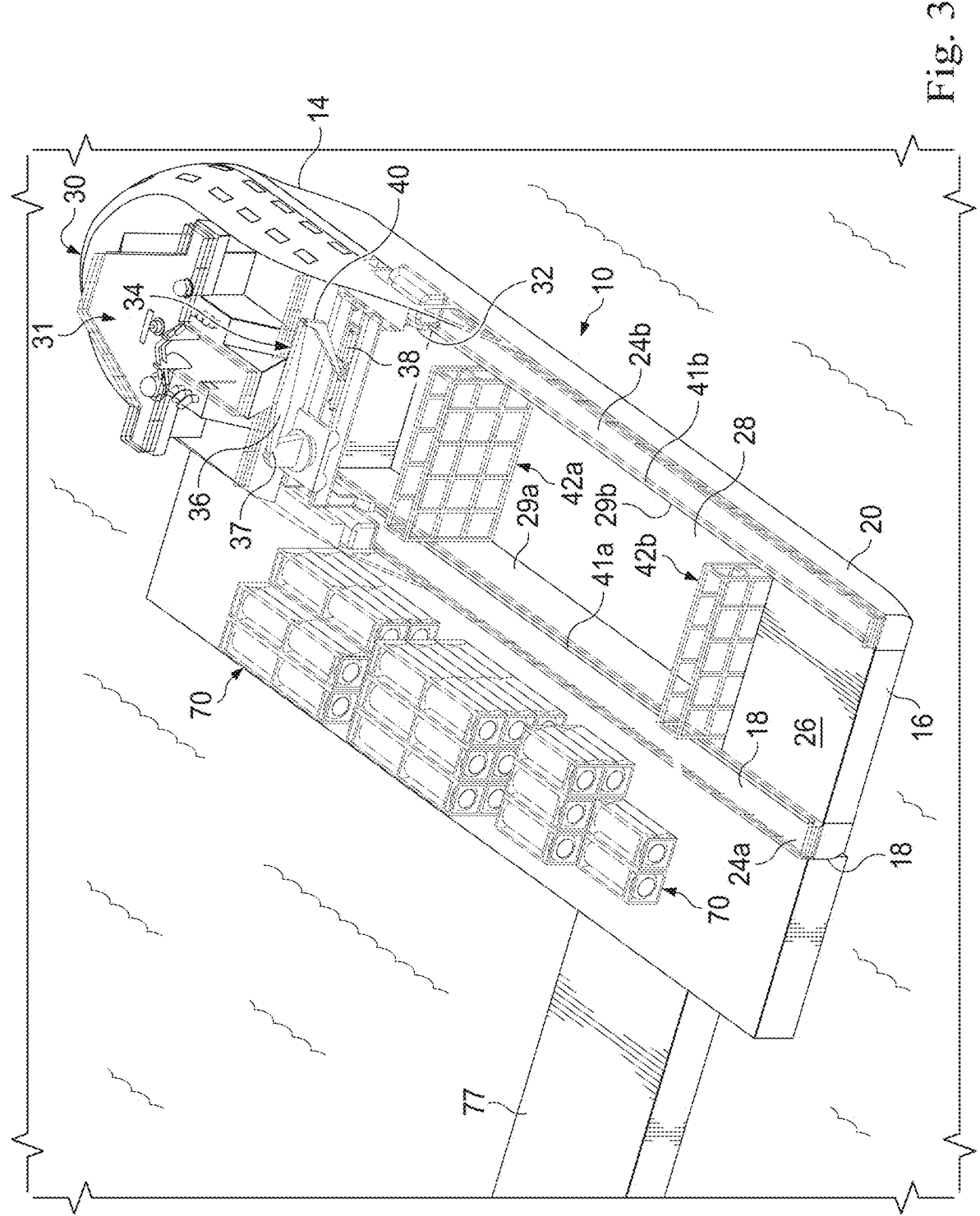
FIG. 3 is a perspective view of a gas supply marine vessel with spaced apart gas interface modules.

Turning to FIG. 3, gas supply marine vessel 10 is shown adjacent a dock facility 77. Gas supply marine vessel 10 has a bow end 14 and a stern end 16. Gas supply marine vessel 10 has a first hull side 18 and an opposing second hull side 20, each hull side having an upper edge 24, such that first hull side 18 has an upper edge 24a and second hull side has an upper edge 24b. Upper deck 26 extends between the hull sides 18, 20. Formed in upper deck 26 between hull sides 18, 20 is an elongated cargo cavity 28, having opposing cavity sides 29a, 29b that are substantially parallel with hull sides 18, 20. In the illustrated embodiment, cargo cavity 28 is open. In one or more embodiments, cargo cavity 28 has a depth D of at least the approximate height of one fuel container assembly 70. In yet other embodiments, such as is illustrated in FIGS. 3 and 21B, cargo cavity 28 may have a depth D of at least the approximate height of two fuel container assemblies 70.

Positioned at the first end 14 of gas supply marine vessel 10 and extending between the two hull sides 18, 20 is a multi-deck, enclosed accommodation structure 30. Accommodation structure 30 generally rises above upper deck 26 and may include a bridge 31.

A gantry assembly 32 straddles cargo cavity 28 between the two hull sides 18, 20. Gantry assembly 32 is movable relative to the two sides 18, 20 along at least a portion of the length of cavity 28.

An articulating crane 34 is mounted on the gantry assembly 32. Articulating crane 34 includes a boom 36 with a first end 37 pivotally attached to the gantry assembly 32 and a cargo engagement mechanism 38 attached to the second end 40 of the boom 36.

A track 41 may extent along at least a portion of the length of cargo cavity 28 to guide gantry assembly 32. In the illustrated embodiment, a first track 41a extends adjacent hull side 18 and a second track 41b extends adjacent hull side 20.

In the illustrated embodiment, two spaced apart gas interface modules 42a, 42b are shown positioned in the cargo cavity 28. Gas interface module(s) 42 may be permanently affixed within cargo cavity 28 or removably attached thereto.

Each gas interface module 42 is disposed to be fluidically coupled to a plurality of fuel container assemblies 70, which in the illustrated embodiment are shown positioned on dock facility 77 prior to loading into cargo cavity 28 utilizing articulating crane 34 and gantry assembly 32.

Figure 4A:
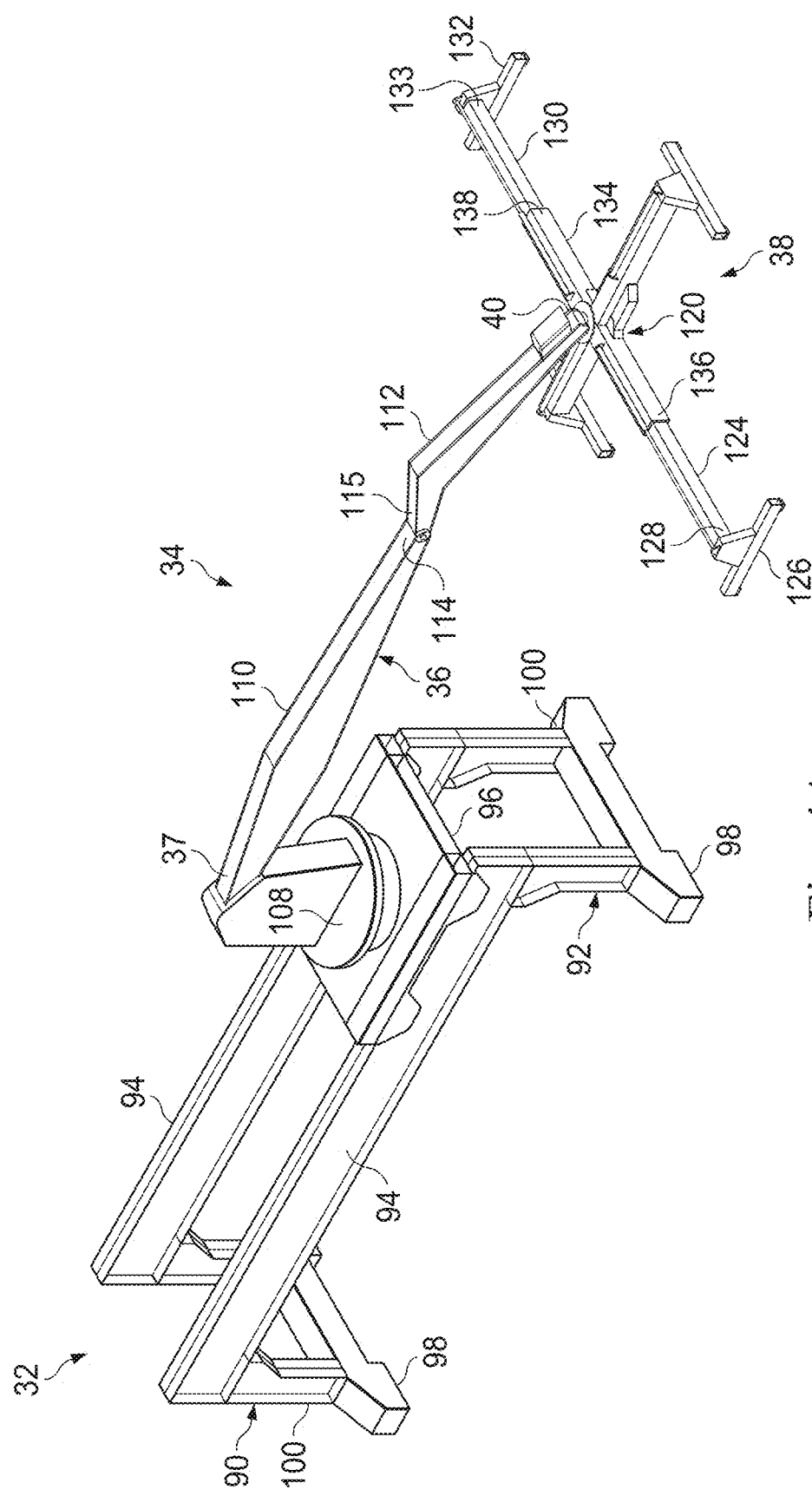
FIG. 4a is a perspective view of a gantry assembly for loading and unloading fuel container assemblies.
Figure 4B:
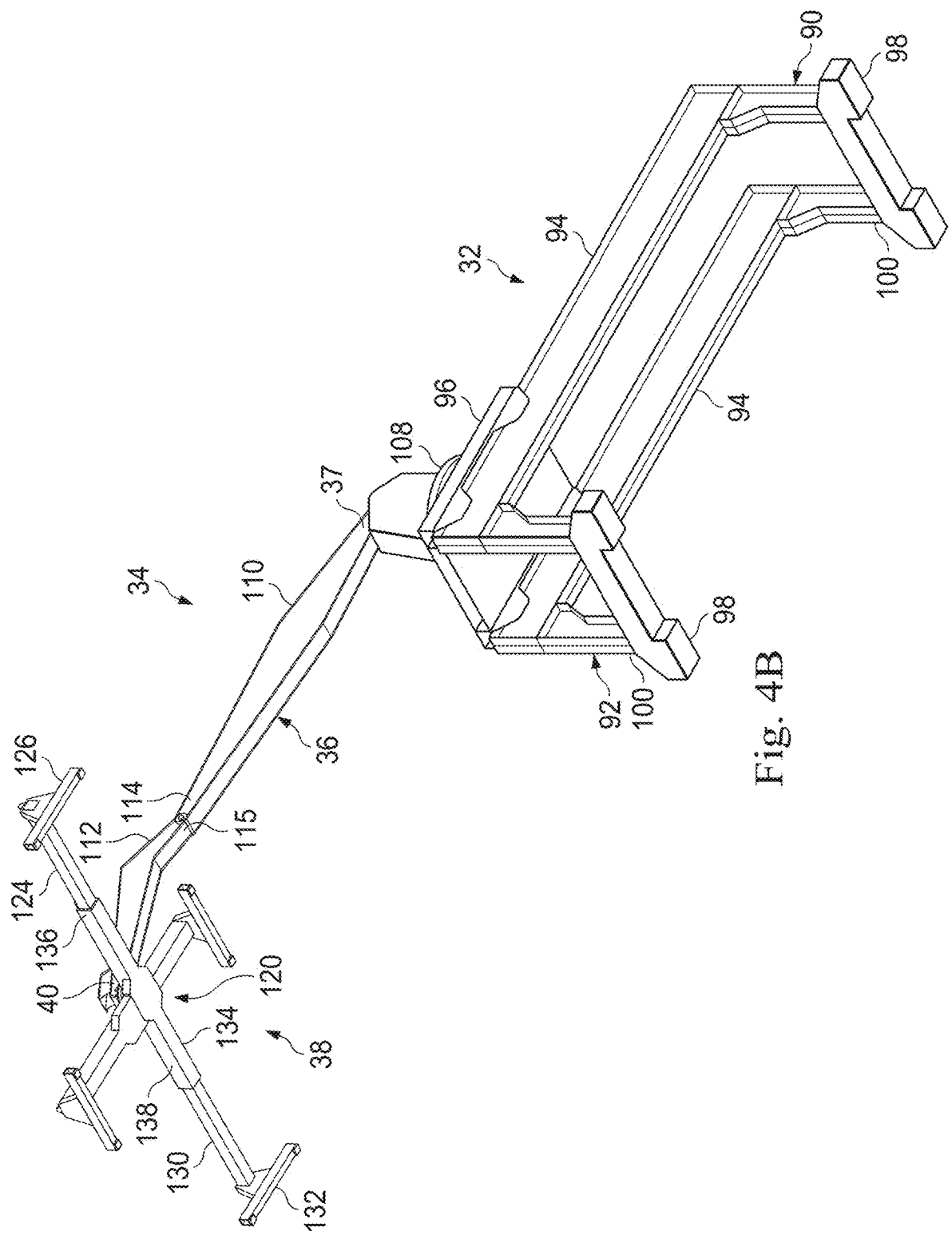

In FIGS. 4a and 4b, some embodiments of gantry assembly 32 and articulating crane 34 are shown in more detail. Gantry assembly 32 may generally includes a first support leg system 90 spaced apart from a second support leg system 92 with one or more bridge girders 94 extending between the first and second support leg systems 90, 92, thereby permitting gantry assembly 32 to straddle cargo cavity 28 (see FIGS. 1-3). Support legs 90, 92 are of sufficient height to allow gantry assembly 32 to move freely above cargo cavity 28 without interference from gas interface modules 42 or fuel container assemblies 70 deployed within cargo cavity 28. Articulating crane 34 is mounted along bridge girder(s) 94. In one or more embodiments, a sled 96 is slidably mounted on the bridge girder(s) 94, with articulating crane 34 pivotally mounted to sled 96. Being slidably mounted, sled 96 can move between sides 18, 20 of hull 12 (see FIG. 1), while in some embodiments, articulating crane 34 can pivot 360 degrees, permitting articulating crane 34 maximum reach for manipulating a fuel container assembly 70.

In one or more embodiments, gantry assembly 32 includes a guide mechanism 98 mounted on a distal end 100 of each support leg assembly 90, 92, each guide mechanism 98 disposed to engage a track 41 adjacent cargo cavity 28 (see FIGS. 1-3). Although not limited to a particular configuration, in one or more embodiments, track 41 is a linear rail and guide mechanism 98 is a wheel. In another embodiment, track 41 is a linear rack and guide mechanism 98 is a pinion.

Although not limited to a particular configuration, in one or more embodiments, articulating crane 34 is a knuckle crane. In any event, articulating crane 34 may comprise a rotatable base 108 to which the first end 37 of boom 36 is attached. In one or more embodiments, boom 36 includes a first arm 110 having first end 37 pivotally attached to the base 108. The second end 114 of first arm 110 attached to a second arm 112 at a first end 115 of the second arm 112. The second end 40 of second arm 112 attaches to a cargo engagement mechanism 38. In one or more embodiments, cargo engagement mechanism 38 is a spreader assembly 120 attached to the second end 40 of second arm 112.

In one or more embodiments, spreader assembly 120 may include a first arm 124 with a first gripper assembly 126 disposed at a distal end 128 of the first arm 124 and a second arm 130 with an opposing second gripper assembly 132 disposed at a distal end 133 of the second arm 130, wherein the second arm 130 is movable relative to the first arm 124. Spreader assembly 120 may further include an elongated base 134 having a first end 136 and a second end 138 with first gripper assembly 126 mounted adjacent the first end 136 and opposing second gripper assembly 132 mounted at the second end 138, where one of the gripper assemblies 126, 132 is movable relative to the other. In this regard, in one or more embodiments, first arm 124 may be slidingly mounted in the first end 136 of elongated base 134 and second arm 130 may be slidingly mounted in the second end 138 of elongated base 134 so that arms telescope from base 134. Thus, elongated base 134 may be a tube with first and second arms 124, 130 telescopically movable relative to one another.

FIG. 5 illustrates gantry assembly 32 and articulating crane 34 mounted adjacent upper deck 26 of gas supply marine vessel 10. Specifically, gantry assembly 32 is shown extending between hull sides 18, 20 along upper deck 26 adjacent cargo cavity 28. In the illustrated embodiment, a track 41 runs along the upper edge 24b of hull side 20 and is engaged by guide mechanism 98 of support leg 92 of gantry assembly 32. Gantry assembly 32 includes one or more bridge girders 94 that extend over cargo cavity 28. A sled 96 is movably mounted on bridge girder 94 and is disposed to slide along bridge girder 94. Articulating crane 34 is likewise mounted on sled 96 and includes a base 108 that may be rotated. In one or more embodiments, base 108 is rotatable 360 degrees to permit articulating crane 34 full access to fuel container assemblies 70 disposed within cargo cavity 28. To this end, articulating crane 34 also includes a boom 36 with a first end 37 pivotally attached to base 108 and a second end 40 attached to a cargo engagement mechanism 38. In one embodiment, cargo engagement mechanism 38 includes a spreader assembly 120 that may be utilized to grasp fuel container assemblies 70. To give articulating crane 34 additional flexibility, boom 36 includes a first arm 110 that can articulate relative to a second arm 112. Operation of gantry assembly 32 and articulating crane 34 can be overseen from bridge 31 mounted on accommodation structure 30, and in particular, crane control cabin 33 overlooking upper deck 26.

Figure 6:
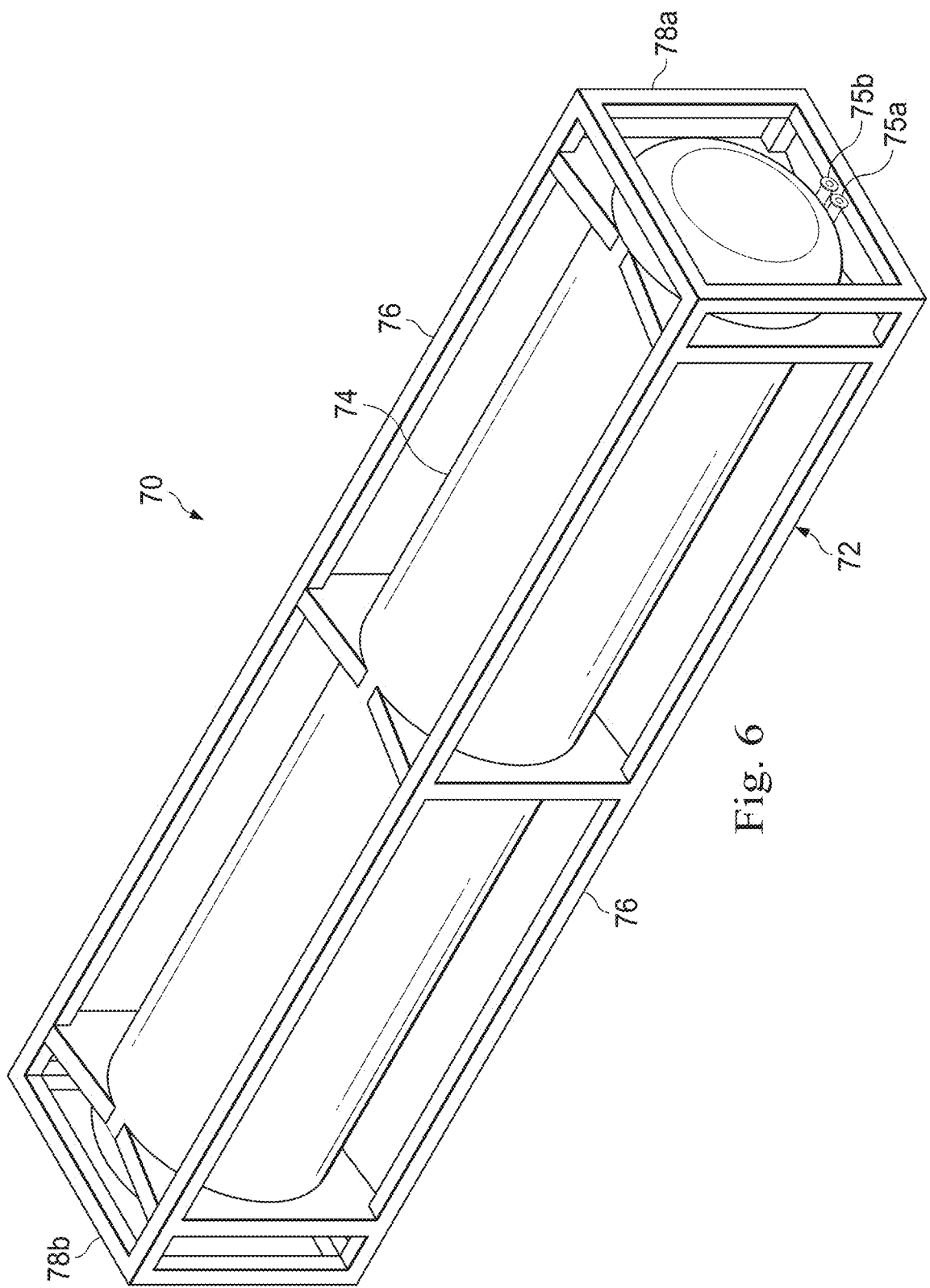
FIG. 6 is a perspective view of a stackable fuel container assembly.

Although fuel container assembly 70 is not limited to any particular configuration so long as it includes fuel vessel 74 and can be manipulated by gantry assembly 32 and articulating crane 34 as generally described herein, FIG. 6 illustrates one embodiment of a fuel container assembly 70. In the illustrated embodiment, fuel container assembly 70 may be formed of a frame 72 supporting a fuel vessel 74 mounted on the frame 72. In one or more embodiments, frame 72 extends around the fuel vessel 74. Where fuel vessel 74 is an elongated cylinder, frame 44 may likewise be elongated, and may include a side frame portion 76 extending between end frame portions 78a, 78b. It will be appreciated that in one or more embodiments, each frame 44 may be configured to allow another frame to be stacked on top of it. Thus, in the illustrated embodiments, the end frame portions 78a, 78b and side frame portions 76 of a first fuel container assembly 70 can be engaged with and support the side frame portion 76 and end frame portions 78a, 78b of a second fuel container assembly 70 stacked on top of the first fuel container assembly 70. In any event, frame 44 preferably surrounds fuel vessel 74 such that fuel container assemblies 70 may be readily manipulated by articulating crane 34 and cargo engagement mechanism 38.

While frame 44 is shown as elongated, neither frame 44 nor fuel vessel 74 are limited to a particular shape. As a non-limiting example, in one embodiment, frame 44 may be square and fuel vessel 74 may be round. In another embodiment, fuel vessel 74 is cylindrical (as best seen in FIG. 6 and frame 44 is rectangular. Frame 44 may also be sized in accordance with standard International Organization for Standardization (ISO) shipping container sizes. Thus, frame 44 may have a width of approximately 2.4 meters, a height of approximately 2.6 meters and a length of approximately 6, 12 or 14 meters to accommodate ground transport of fuel container assemblies 70 my standard sized vehicles. Typically, fuel container assemblies 70 carried by frames of these standard ISO dimensions would have volumes of approximately 45 to 47 $m^3$ for a 12 meter container and approximately 22 to 24 $m^3$ for a 6 meter container in order to supply the commercial amounts of fuel contemplated by the refueling facilities described herein. Moreover, frame 44 may include weight bearing corner posts and corner castings in each of the eight corners to allow fuel container assemblies 70 to be readily stacked as described herein. In some embodiments, fuel container assembly 70 is a T50 ISO tank container.

Likewise, fuel vessel 74 is not limited to a particular shape or configuration. Thus, in some embodiments, fuel vessel 74 may be elongated and cylindrical, or may be bi-lobed in shape. In any event, fuel vessel 74 is generally provided to transport liquified natural gas (LNG), liquified petroleum gas (LPG), compressed natural gas (CNG), and similar fuels. Thus, fuel vessel 74 may be insulated to maintain the low temperature of the liquified gas. The fuel vessel 74 may be a cryogenic container. The fuel vessel 74 may be a pressure vessel to maintain the gas as a liquid or in a compressed fluid. Thus, fuel vessel 74 may be double walled, having an inner wall and an outer wall with insulation disposed between the inner and outer walls.

In one or more embodiments, fuel vessel 74 includes a first port 75a for loading/unloading of LNG or LPG and a second port 75b for vapor.

Figure 7:
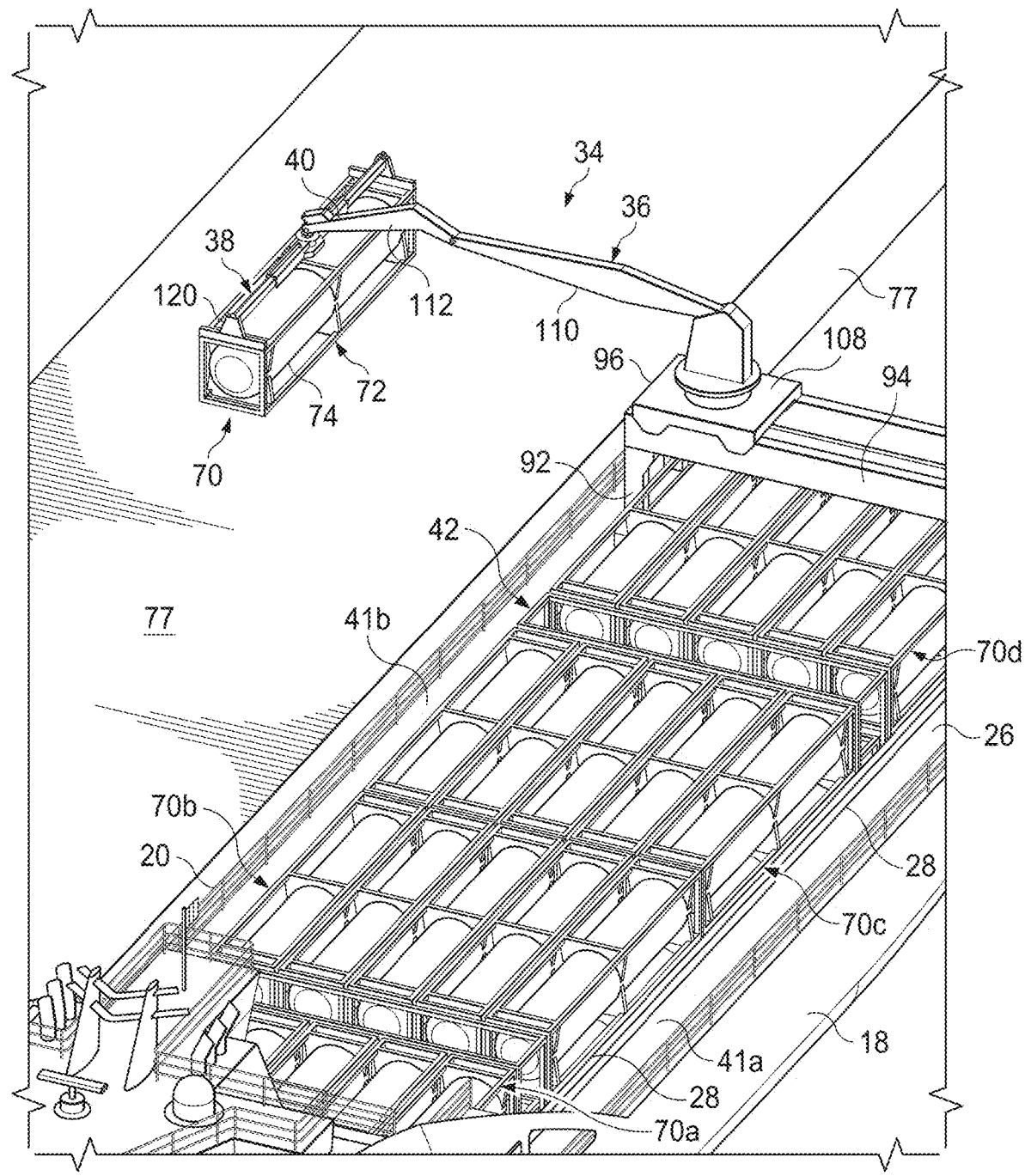
FIG. 7 is a perspective view of a gantry assembly of a gas supply marine vessel moving a fuel container assembly adjacent a dock facility.

FIG. 7 illustrates gantry assembly 32 and articulating crane 34 of gas supply marine vessel 10 moving a fuel container assembly 70. In this embodiment, cargo cavity 28 is shown formed in upper deck 26. A plurality of fuel container assemblies 70 are shown disposed within cargo cavity 28 in stacked fashion. In the embodiment, gantry assembly 32 is shown extending over cargo cavity 28 and the stacked fuel container assemblies 70 deployed therein. It will be appreciated that bridge girder 94 extends between support legs 92 of gantry assembly 32 at a sufficient height to allow gantry assembly 32 to move along tracks 41 disposed along the edge 24 of hull sides 18, 20 without interfering with the stacked fuel container assemblies 70. In this embodiment, a plurality of fuel container assemblies 70 are illustrated, arranged in sets 70a, 70b, 70c and 70d. Second set 70b and third set 70c of fuel container assemblies 70 are shown stacked and fluidically coupled to a gas interface module 42 disposed in cargo cavity 28. The cargo engagement mechanism 38 of articulating crane 34 is shown engaging a fuel container assembly 70, and in particular, a spreader assembly 120 is shown grasping frame 72 in which is mounted a fuel vessel 74. In the embodiment, base 108 of articulating crane 34 is pivoted on sled 96 to remove fuel container assembly 70 from set 70a of fuel container assemblies 70. Gantry assembly 32 is moved along deck 26 to a desired location adjacent dock facility 77, at which point first and second articulating arms 110, 112 of boom 36 may be extended to place fuel container assembly 70 on dock facility 77.

Figure 8:
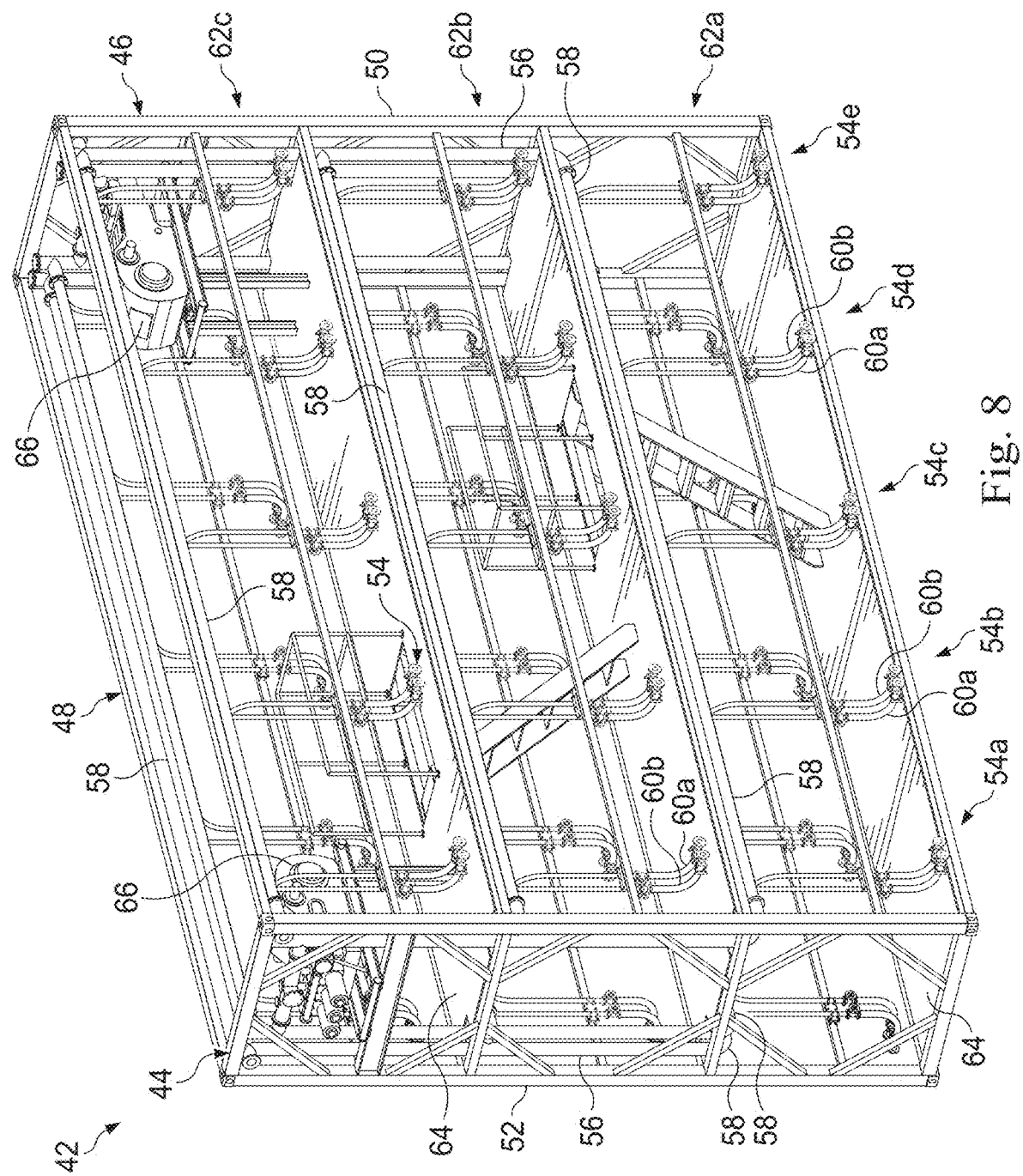
FIG. 8 is a perspective view of a gas interface module.

Turning to FIG. 8, embodiments of a gas interface module 42 are described in more detail. In one or more embodiments, each gas interface module 42 has an elongated frame 44 having a first elongated side 46 and an opposing second elongated side 48, which sides 46, 48 extend between a first end 50 and a second end 52. In one or more embodiments, the frame 44 of one or more of the gas interface modules 42 extends substantially between the two hull sides 18, 20, the full width W of the cargo cavity 28. Additionally, in one or more embodiments, a plurality of spaced apart fuel vessel docking stations 54 along the length of at least one frame side 46, 48. Although not limited to a particular configuration, in the illustrated embodiment, each gas interface module 42 includes at least five fuel docking stations 54 along a frame side, namely fuel docking stations 54a, 54b, 54c, 54d and 54e.

Each gas interface module 42 includes a pipe manifold 56 which may have one or more gather pipes 58 extending along a portion of the length of the frame 44 and fluidically connecting the docking stations 54. Each docking station includes at least one fuel vessel connection line 60 fluidically connected to the gather pipe 58. In one or more embodiments, each docking station 54 has two fuel vessel connection lines 60a, 60b fluidically connected to a gather pipe 58. One fuel vessel connection line 60a may be a loading/discharge line and the other fuel vessel connection line 60b may be a vapor return line.

While a gas interface module frame 44 may have only have a single level 62, in one or more embodiments, frame 44 may a plurality of spaced apart levels 62. In one or more embodiments, frame 44 may have two levels to accommodate at least two fuel container assemblies 70 stacked on top of one another, while in other embodiments, frame 44 may have at least three levels to accommodate at least three fuel container assemblies 70 stacked on top of one another. In any event, in one or more embodiments, each level 62 may be the approximate height of a fuel container assembly 70 as described above. Moreover, each level 62 may include a walkway 64 extending between the two frame ends 50, 52, with each fuel vessel docking stations 54 of a level 62 positioned above the walkway 64. In one or more embodiments, fuel vessel docking stations 54 are spaced apart along the length of the gather pipe 58. In one or more embodiments, the fuel vessel connection lines 60 are spaced apart along the length of the gather pipe 58. In the illustrated embodiment, at least five spaced apart fuel vessel docking stations 54 are deployed at each level 62. Likewise, the gas interface module 42 may include a plurality of spaced apart fuel vessel docking stations 54 along the length of both elongated frame sides 46, 48. Finally, a gas interface module 42 may include one or more pumps 66 carried by the frame 44 and in fluid communication with the pipe manifold 56.

Figure 9:
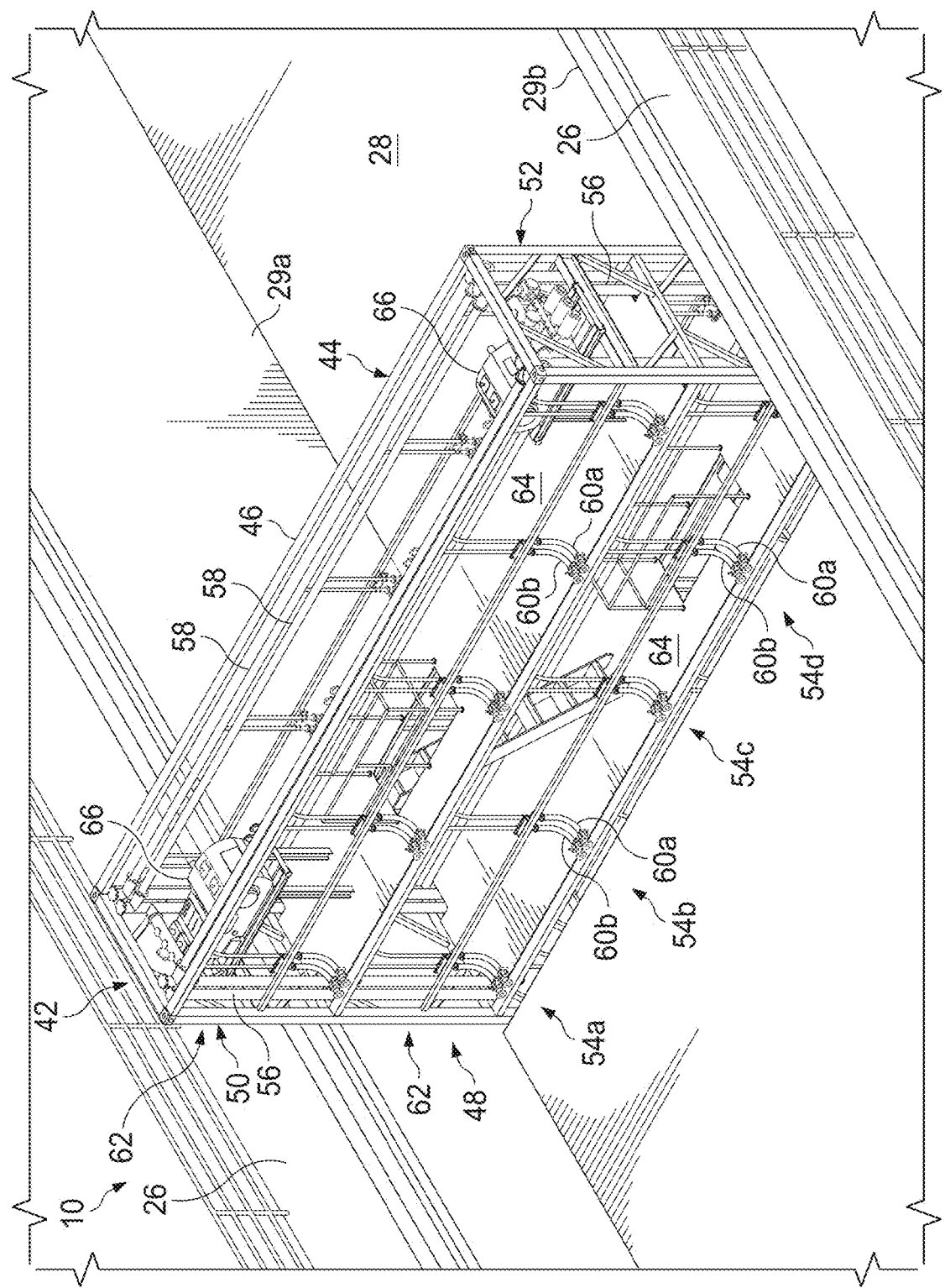
FIG. 9 is a perspective view of the gas interface module of FIG. 7 installed on a gas supply marine vessel.
Figure 10:
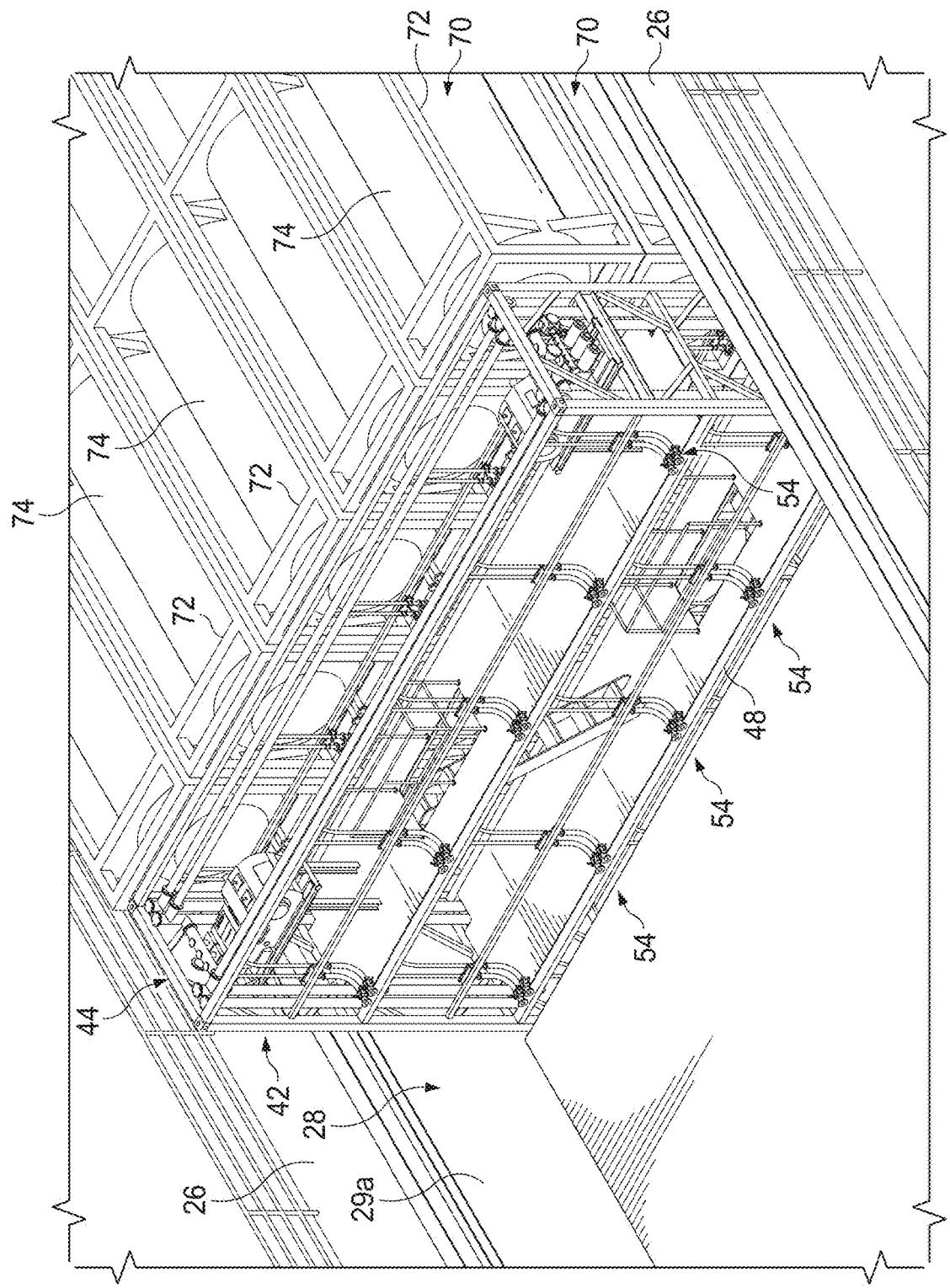
FIG. 10 is a perspective view of a gas supply marine vessel with stacked fuel container assemblies fluidically coupled to one side of a gas interface module.
Figure 11:
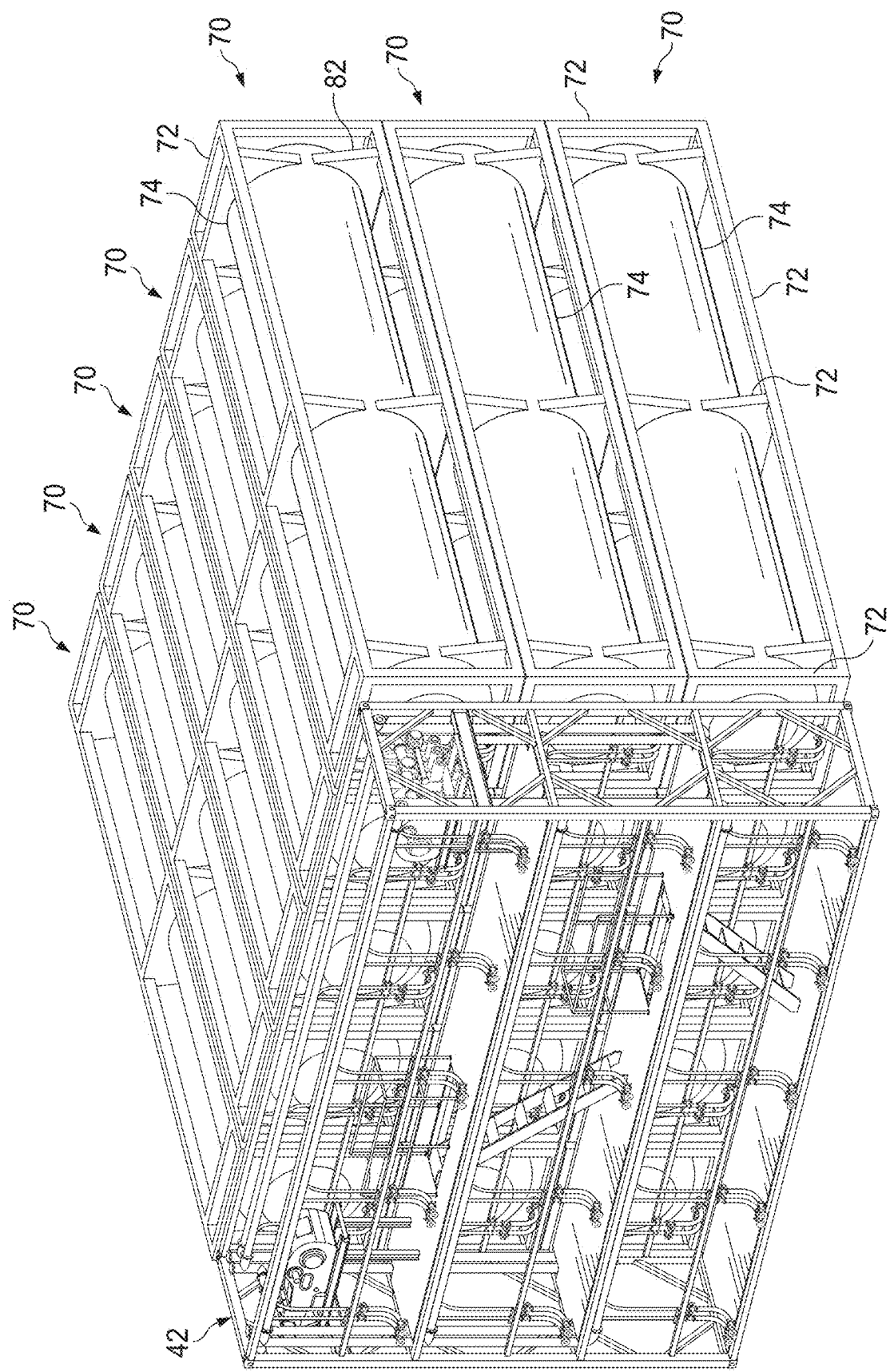
FIG. 11 is a perspective view of stacked fuel container assemblies fluidically coupled to one side of a gas interface module.
Figure 12:
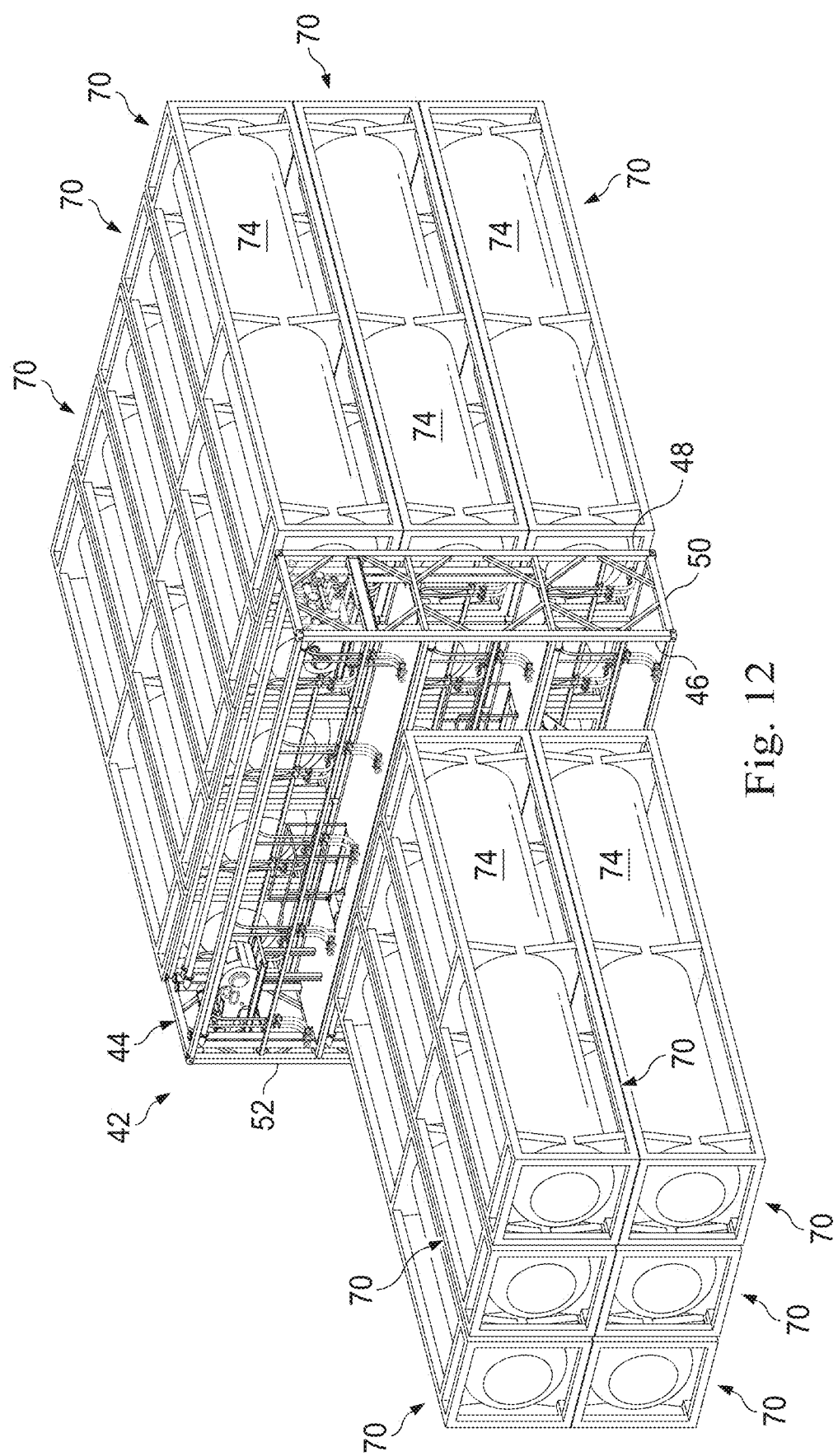
FIG. 12 is a perspective view of the gas interface module of FIG. 11 with fuel container assemblies fluidically coupled to both sides of the gas interface module.

FIG. 9 specifically illustrates a gas interface module 42 disposed in cargo cavity 28 formed in upper deck 26 of a gas supply marine vessel 10. In this embodiment, gas interface module 42 extends between cargo cavity sides 29*a*, 29*b*. FIG. 10 further illustrates a plurality of stacked fuel container assemblies 70 fluidically coupled to gas interface module 42 of FIG. 9. FIG. 11 is a perspective view of a plurality of stacked fuel container assemblies 70 fluidically coupled to one side of a gas interface module 42. In particular, a set of fuel container assemblies 70 is shown with five stacks of fuel container assemblies 70, with three fuel container assemblies 70 in each stack. Each fuel container assembly 70 is separately coupled to gas interface module 42 at its own docking station 54. FIG. 12 is a perspective view of the gas interface module 42 of FIG. 11 with fuel container assemblies 70 fluidically coupled adjacent both frame sides 46, 48 of the gas interface module 42.

In embodiments where two or more fuel container assemblies 70 are stacked on top of one another, the lowermost fuel container assemblies 70 may be fluidically coupled to a gas interface module 42, while the upper most fuel container assemblies 70 of the stack may remain fluidically uncoupled from the gas interface module 42, thereby permitting the uncoupled fuel container assemblies 70 to be off-loaded by articulating crane 34 to a cargo vehicle 250 or to floating refueling facility 200 (see FIG. 21*c*), while fuel from the lowermost fuel container assemblies 70 may be pumped in volume through the gas interface module 42. Where three or more fuel container assemblies 70 are stacked, the lower most two fuel container assemblies 70 may be fluidically connected to gas interface module 42, while the one or more upper fuel container assemblies 70 in the stack may remain fluidically uncoupled for movement by gantry assembly 32 and articulating crane 34.

Figure 13:
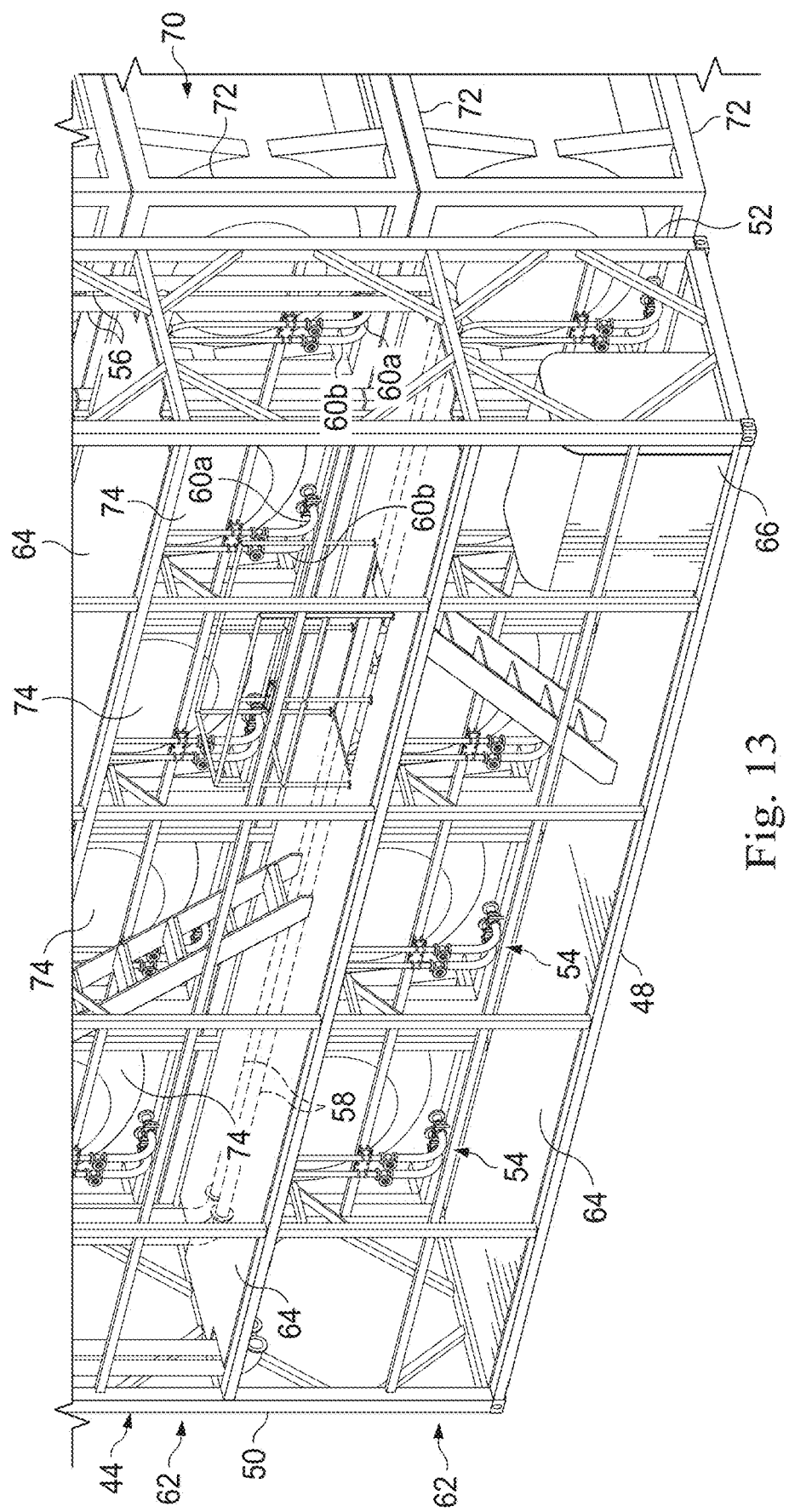
FIG. 13 is a close-up perspective view of the gas interface module of FIG. 11.

FIG. 13 is a close-up perspective view of a gas interface module 42. In the illustrated embodiment, gas interface module 42 is shown as having multiple, spaced apart levels 62 defined by frame 44. Each frame 44 has a first elongated side 46 and an opposing second elongated side 48, which sides 46, 48 extend between a first end 50 and a second end 52 of frame 44. Each level 62 includes a walkway 64 extending between the two frame ends 50, 52. A plurality of spaced apart fuel vessel docking stations 54 extend along each level 62 between the two frame ends 50, 52. A fuel container assembly 70 may be coupled to a fuel vessel docking station 54. In the illustrated embodiment, each of a plurality of fuel container assemblies 70 is separately coupled to a separate fuel vessel docking stations 54. Fuel vessel docking stations 54 are fluidically coupled to a pipe manifold 56 having at least one gather pipe 58 extending along substantially the length of the frame 44. One fuel vessel connection line 60*a* may be a loading/discharge line and the other fuel vessel connection line 60*b* may be a vapor return line.

Figure 14:
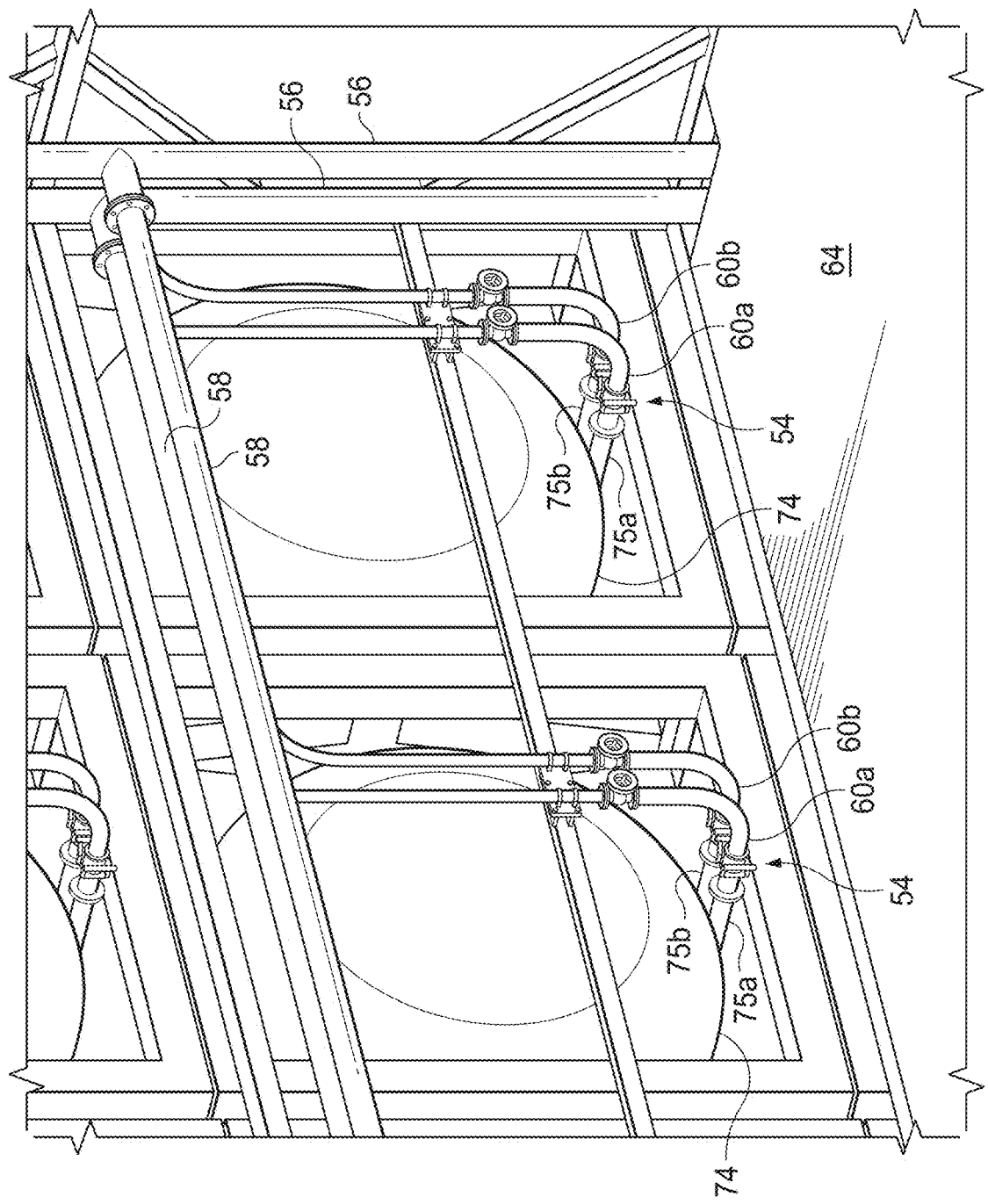
FIG. 14 is a close-up perspective view a fuel container assembly docking station of a gas interface module.

FIG. 14 is a close-up perspective view a fuel container assembly docking station 54 of a gas interface module 42. In such embodiments, fuel vessel connection line 60*a* may be connected to first port 75*a* of a fuel vessel 74 and fuel vessel connection line 60*b* may be connected to second port 75*b* of fuel vessel 74 to permit loading and unloading of fuel vessel 74. In the illustrated embodiment, a plurality of fuel vessel connection lines 60*a* are shown fluidically coupled to gather pipe 58*a* and a plurality of fuel vessel connection lines 60*b* are shown fluidically coupled to gather pipe 58*b* which together form part of pipe manifold 56.

Turning generally to FIGS. 15-22, there is shown embodiments of a floating refueling facility 200 which can readily be installed either temporarily or permanently along a coastline. Floating refueling facility 200 is particularly well suited for refueling activities in connection with gas supply marine vessel 10. It will be appreciated that floating refueling facility 200 is self-contained, and thus, with minimal effort, can be positioned in remote locations where it is desirable to provide either a fueling station or a fuel storage station.

Fuel container assemblies 70 may be selectively coupled and decoupled from the gas interface module 42. In one or more embodiments, the pipe manifold 56 of the gas interface module 42 may be fluidically coupled to fuel storage vessels 74 (see FIG. 15) on a dock, such as floating refueling 200 described below, or along a shoreline in order to resupply the fuel storage vessels 74 with fuel contained in the plurality of fuel container assemblies 70 fluidically coupled to the gas interface module 42. In other embodiments, a fuel container assembly 70 may be decoupled from the gas interface module 42 and moved to a dock or vehicle utilizing gantry assembly 32 and articulating crane 34 as described above. Fuel container assemblies 70 that are to be moved from gas supply marine vessel 10 need not be coupled to a gas interface module 42, but may be simply stored on deck 26 (see FIG. 1) or within cargo cavity 28. The dock, such as floating refueling facility 200 described below, may likewise include one or more gas interface modules 42 to which the moved fuel container assemblies 70 may be fluidically coupled.

Figure 15A:
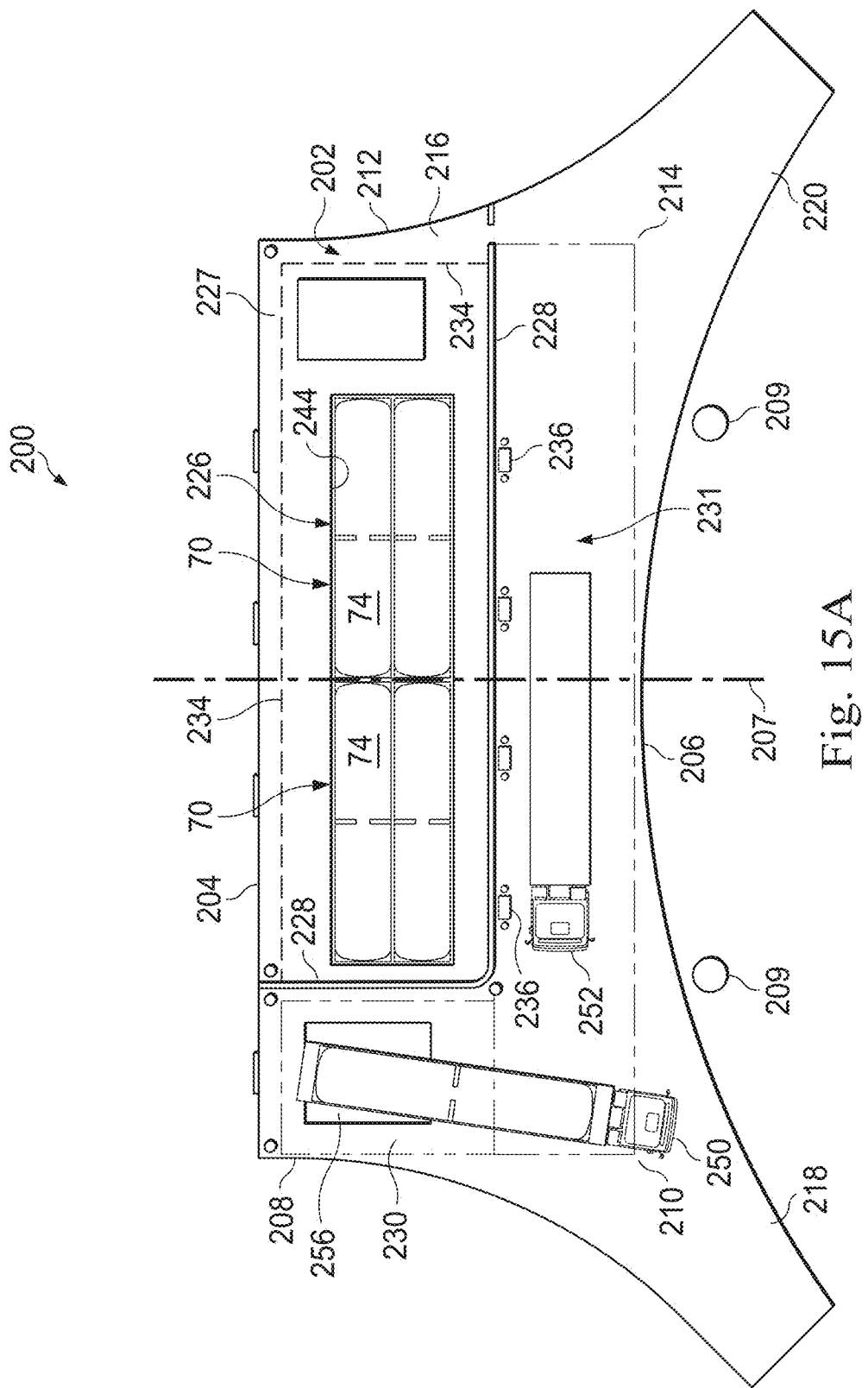
FIG. 15a is an overhead view of a floating refueling facility.

With specific reference to FIGS. 15*a*-15*c*, a refueling facility 200 is shown and generally depicted as a floating refueling facility 200. Floating refueling facility 200 includes a deck 202 having an elongated first side 204 and an elongated second side 206 opposite the elongated first side 204. Deck 202 may further include a first end 208 intersecting the second side 206 to form a first corner 210, and likewise, a second end 212 intersecting the second side 206 to form a second corner 214. An upper deck surface 216 extends between the sides 204, 206 and the ends 208, 212 of deck 202. Although upper deck surface 116 may have any shape, in one or more embodiments, upper deck surface 216 includes a first angled extension 218 projecting away from first corner 210 and a second angled extension 220 projecting away from the second corner 214. In some embodiments, in order to enhance vehicular ingress and egress to deck 202, angled extensions 218, 220 may project from deck 202 at approximately 45 degrees relative to a centerline 207 bisecting second side 206.

In one or more embodiments, as best seen in FIG. 15*a*, the second side 206 of deck 202 is parabolic in shape between the first and second angled extensions 218, 220. In one or more embodiments, the second side 206 of deck 202 is concave in shape between the first and second angled extensions 218, 220. Although additional piers 209 may be utilized, it will be appreciated that the parabolic shape allows second side 206 of floating refueling facility 200 to be engaged with and secured utilizing only two piers 209 spaced apart about centerline 207. The parabolic shape inhibits lateral movement of station 200 relative to piers 209.

Furthermore, in one or more embodiments, upper deck surface 216 may be curvilinear in shape at the intersection between the first end 208 and the first angled extension 218, and upper deck surface 216 may be curvilinear in shape at the intersection between the second end 212 and the second angled extension 220.

At least one float 224 supports deck 202. In one or more embodiments, a plurality of floats 224 support deck 202. Floats 224 may be spaced apart from one another. Floats 224 may be positioned adjacent one or more of opposing sides 204, 206 or opposing ends 208, 212. Floats are not limited a particular type or placement so long as they provide buoyancy to deck 202. Thus, in one or more embodiments, floats 224 may be pontoons, while in other embodiments, floats 224 may be one or more barges. Likewise, float 224 may be rigid or inflatable. Float 224 may be a barge that extends between sides 204, 206 and ends 208, 212.

Floating refueling facility 200 may include an enclosure 226 defined by a perimeter 227. In one or more embodiments, enclosure 226 may include a blast wall 228 extending along at least a portion 229 of the perimeter closest to the second side 206. In one or more embodiments, the enclosure is 226 is rectangular in shape, generally corresponding to the shape of deck 202. In one or more embodiments, the perimeter 227 of the enclosure 226 adjacent the first end 208 is spaced apart from the first end to form a cargo loading area 230 between the enclosure 226 and the first end 208. In some embodiments, the blast wall 228 may extend along at least a portion 232 of the perimeter 227 of the enclosure 226 closest to the first end 208. In some embodiments, the blast wall 228 closest to the second side 206 extends along the length of the enclosure 226 to adjacent the second end 212 of the deck 202. Likewise, enclosure 226 may include a fence 234 or similar perimeter barrier extending around a portion of perimeter 227 that does not have a blast wall 228 positioned therealong. It should be appreciated that while a blast wall 228 is preferred in some embodiments, in other embodiments, blast wall 228 may be omitted from floating refueling facility 200.

Cargo loading area 230 may be disposed for receipt of a cargo vehicle 250 capable of carrying a fuel container assembly 70 as described herein. It will be appreciated that cargo vehicle 250 is generally disposed for receipt of a single fuel container assembly 70 of standard ISO dimensions as described herein.

One or more fuel dispensers 236 may be disposed along enclosure 226 between enclosure 226 and the second side 206 of the deck 202 in a refueling area 231. In some embodiments, a plurality of spaced apart fuel dispensers 236 may be disposed along the blast wall 228 between the blast wall 228 and the second side 206 of the deck 202. Refueling area 231 may be disposed for receipt of a vehicle 252 requiring refueling. It will be appreciated that a fuel dispenser 236 as described herein is not limited to any particular mechanism, but may include pumps, valves and the like to allow vehicles 252 or other fuel containers to be individually filled with fuel from the fuel container assemblies 70 and/or gas interface module 42.

In one or more embodiments, a fuel container depression 244 may be formed in upper deck surface 216 within the perimeter 227 of enclosure 226 much like the cargo cavity 28 of gas supply marine vessel 10. The fuel container depression 244 may be elongated and rectangular, with a shape generally similar to enclosure 226. In one or more embodiments, the fuel container depression 244 may have a depth of at least a portion of the height of a fuel container assembly 70. In the illustrated embodiment of FIG. 15C, the fuel container depression 244 has a depth of at least approximately one-half of the height of a fuel container assembly 70. In other embodiments, fuel container depression 244 may be omitted. However, it will be appreciated that floating refueling facility 200 may be subjected to wave action and turbulence, and that fuel container depression 244 functions to secure and partially protect fuel container assemblies 70 disposed therein. In addition, fuel container depression 244 functions to contain any type of spillage that might occur from fuel container assemblies 70. Finally, fuel container depression 244 may function as a partial barrier between fuel container assemblies 70 and any vehicles that might be present on floating refueling facility 200. In this regard, in some embodiments, the above-described blast wall 228 closest to the second side 206 extends at least along the length L of the fuel container depression 244. Similarly, the blast wall 228 closest to the first end 208 extends at least along the width W of the fuel container depression 244.

In one or more embodiments, fuel handling equipment 256 may be carried by deck 202, rendering floating refueling facility 200 as self-contained. Fuel handling equipment 256 may be carried by the deck 202 below the upper deck surface 216. In one or more embodiments, the fuel handling equipment 256 may be positioned below deck 202 along the L-shaped extension 222 of upper deck surface 216. In yet other embodiments, fuel handling equipment 256 is carried by the deck 202 within the perimeter 227 of the enclosure 226. In some embodiments, fuel handling equipment 256 includes a compressor. In some embodiments, fuel handling equipment 256 includes pump.

Enclosure 226 is disposed for receipt of one or more fuel container assemblies 70. Thus, in preferred embodiments, at least one fuel container assembly 70 is disposed within the perimeter 227 of the enclosure 226. Moreover, in one or more embodiments, fuel container assemblies 70 are positioned and received within fuel container depression 244. In the illustrated embodiment, fuel container depression 244 receives a plurality of fuel container assemblies 70. Blast wall 228 may be positioned adjacent fuel container assemblies 70 regardless of how they are housed within enclosure 226.

A pipe manifold (not shown) may fluidically connect the one or more fuel container assemblies 70 and the at least one fuel dispenser 236.

In the illustrated embodiment, a canopy 245 may extend from blast wall 228 over the one or more fuel dispensers 236.

Figure 16:
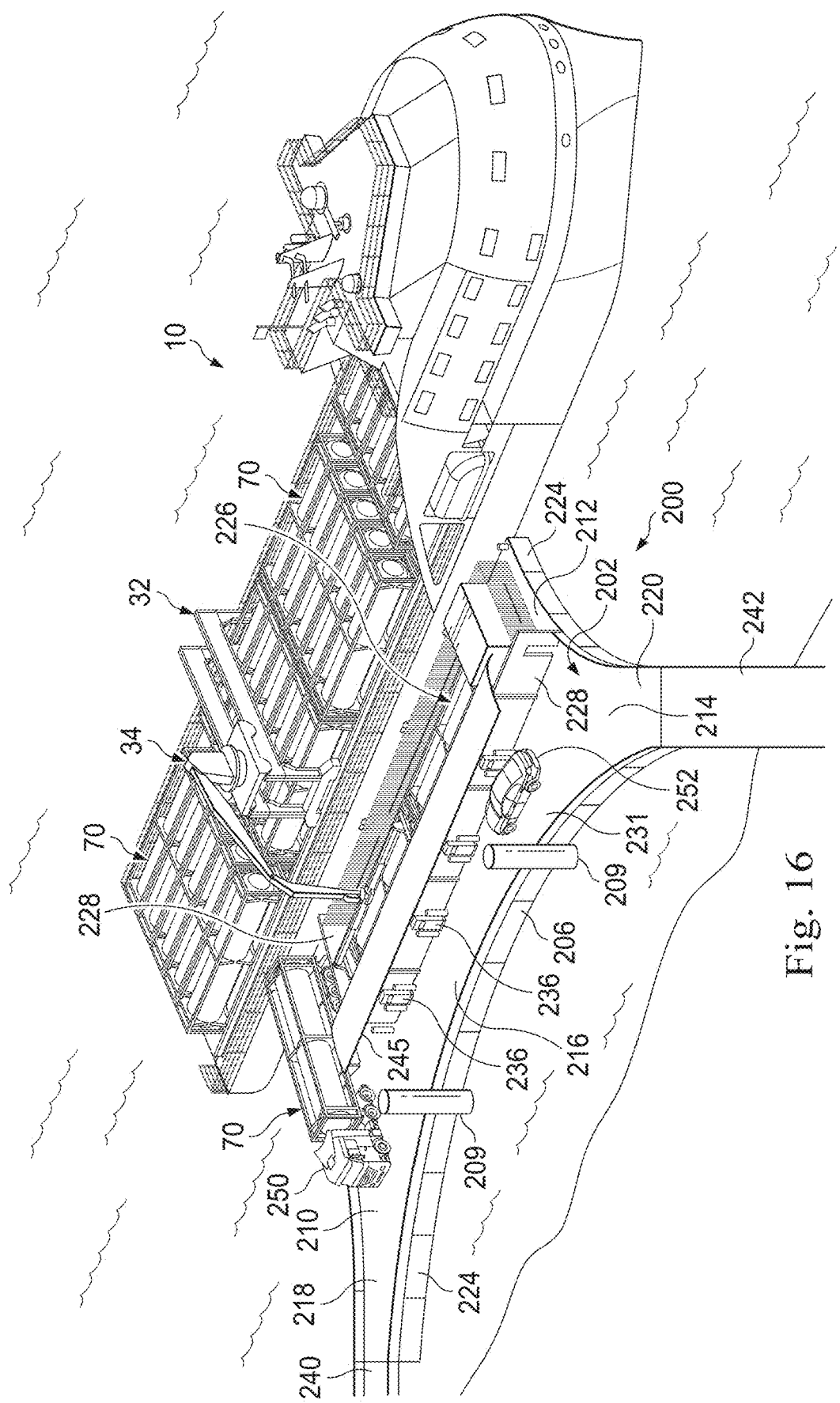
FIG. 16 is a perspective view of a gas supply marine vessel docked at a floating refueling facility.
Figure 17:
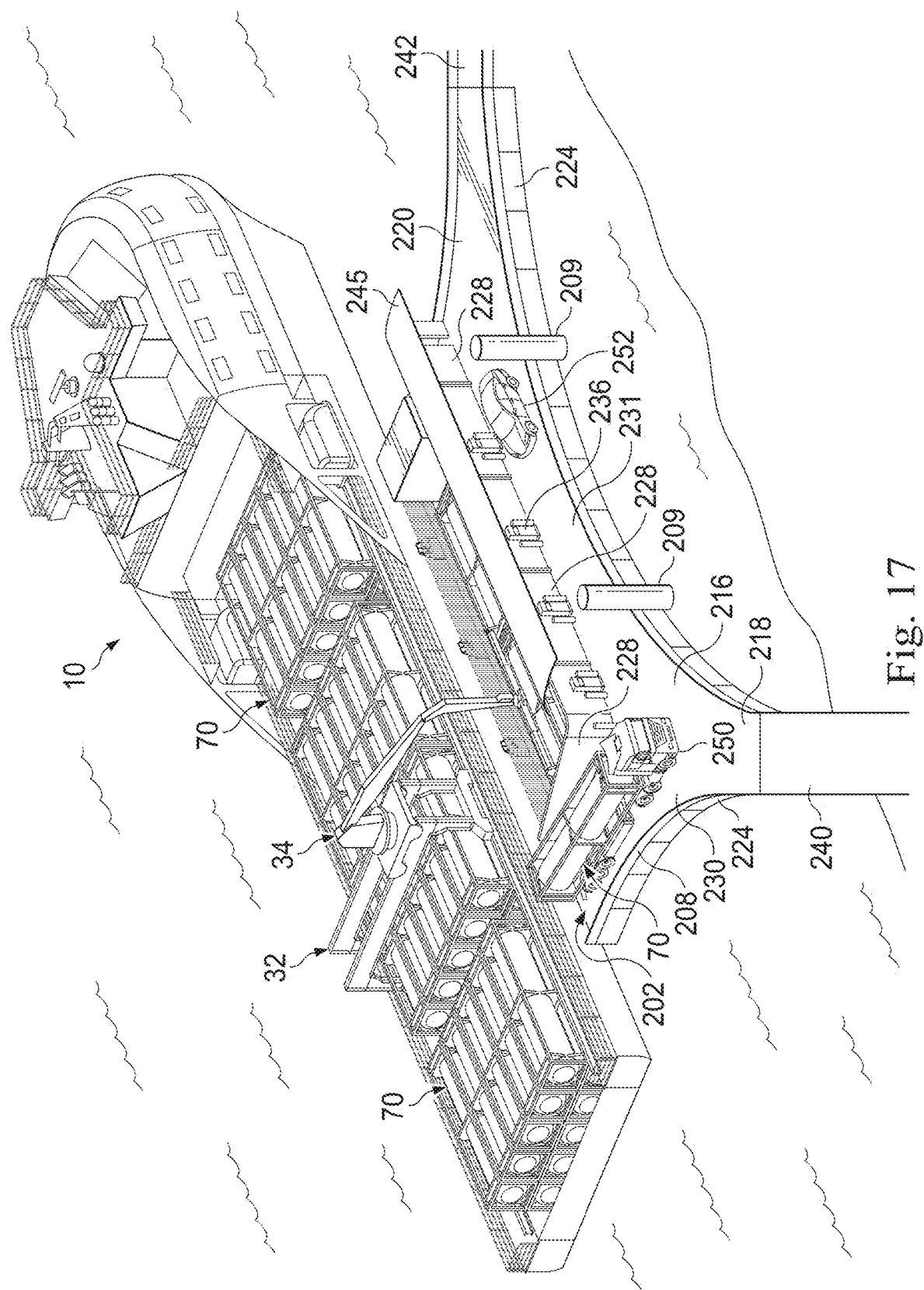
FIG. 17 is another perspective view of the gas supply marine vessel of and floating refueling facility of FIG. 16.
Figure 18A:
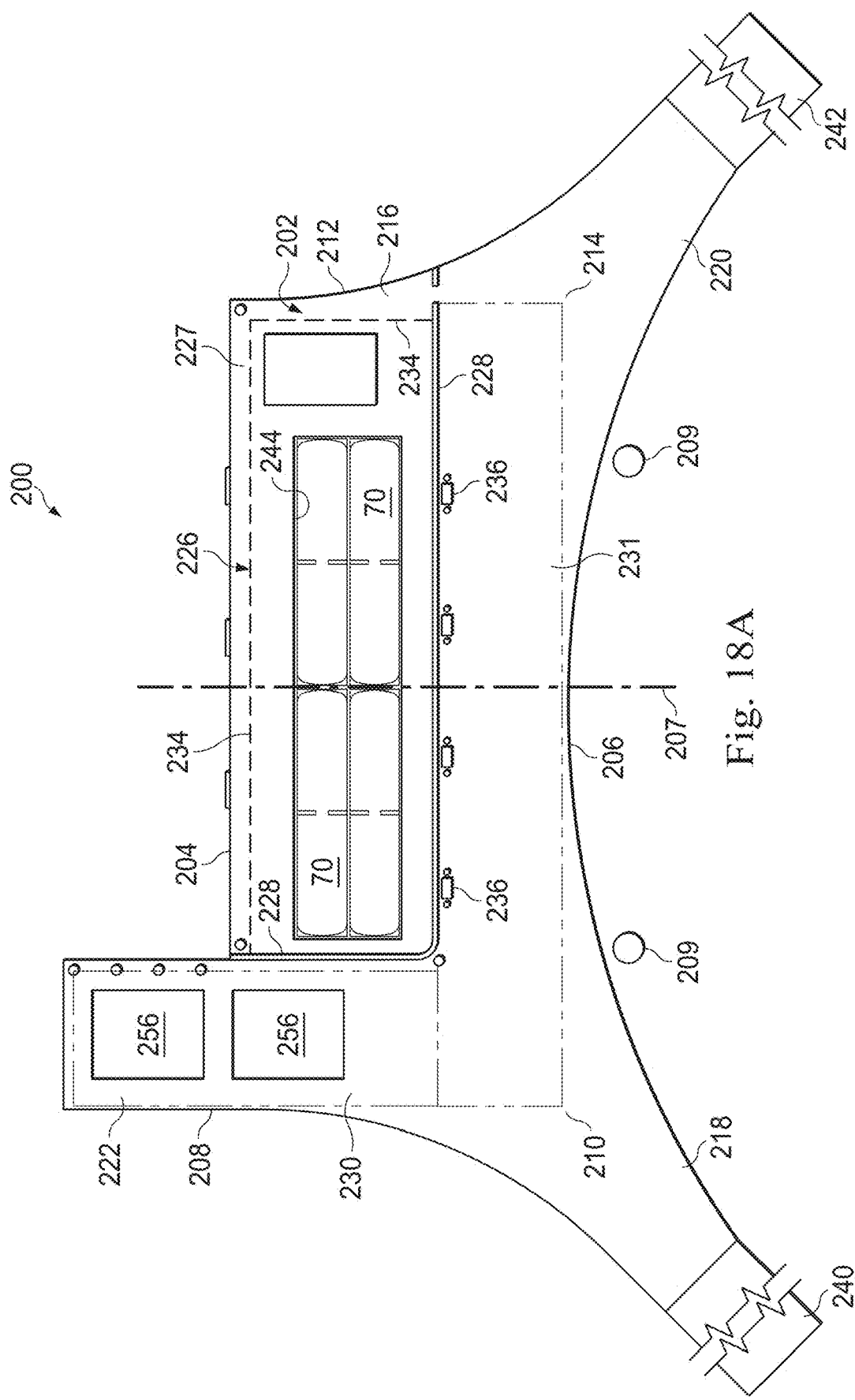
FIG. 18a is an overhead view of another embodiment of a floating refueling facility.

FIGS. 16 and 17 are perspective views of one embodiment of floating refueling facility 200 with a gas supply marine vessel 10 docked thereto. In this embodiment, floating refueling facility 200 includes a first linkspan 240 attached to the first angled extension 218 and a second linkspan 242 attached to the second angled extension 220. Each linkspan 240, 242 may be pivotally attached to deck 202 to accommodate changing tides and the rise and fall of deck 202. Moreover, in one or more embodiments, at least one linkspan 240, 242 forms an angle of greater than 90 degrees with each of the second side 206 and the respective end 208, 212 from which it extends. In some embodiments, the angle between linkspan 240 and the primary length of end 208 is at least 120 degrees. In some embodiments, the angle between linkspan 242 and the primary length of end 212 is at least 120 degrees. This angled nature of the linkspans 240, 242 promote ease of ingress and egress from floating refueling facility 200, particularly given the parabolic shaped second side 206.

As shown in these Figures, floating refueling facility 200 can be multi-functional, providing direct fueling of vehicles 252 via fuel dispensers 236, as well as loading and unloading of cargo vehicles 250 utilized to transport fuel container assemblies 70. As shown, articulating crane 34 and gantry assembly 32 on gas supply marine vessel 10 are particularly well suited for manipulating fuel container assemblies 70 between gas supply marine vessel 10 and floating refueling facility 200. As shown, the reach of articulating crane 34 extends over enclosure 226 so as to place and remove fuel container assemblies 70 from fuel container depression 244 within fence 234. The reach of articulating crane 34 also extends to cargo vehicle 250, particularly as gantry assembly 32 moves up and down the length of gas supply marine vessel 10. Thus, articulating crane 34 can be used to move fuel container assemblies 70 between gas supply marine vessel 10 and enclosure 226; between gas supply marine vessel 10 and cargo vehicles 250; and between enclosure 226 and cargo vehicles 250.

Turning to FIGS. 18a-18d, another embodiment of floating refueling facility 200 is shown. This embodiment is similar to the embodiment shown in FIGS. 15a-15c, but has a deck 202 shape that facilitates easier loading and unloading of cargo vehicles 250. Specifically, in one or more embodiments, the first end 208 of deck 202 extends beyond the elongated first side 204 of deck 202 forming an L-shaped extension 222 of upper deck surface 216. In other regards, the floating refueling facility 200 of FIGS. 18a-18d are similar to the floating refueling facility 200 of FIGS. 15a-15c.

Thus, floating refueling facility 200 includes a deck 202 supported on floats 224 and having an elongated first side 204 and an elongated second side 206 opposite first side 204, where second side 206 of deck 202 is concave in shape between the first and second angled extensions 218, 220, thereby allowing second side 206 to be easily engaged with and secured utilizing only two spaced apart piers 209 which can be installed adjacent a shoreline at a desired location for the floating refueling facility 200. The shaped second side 206 enhances ease of deploying floating refueling facility 200 along a shoreline by simply installing two spaced apart piers 209 at a desired location along a shoreline (not shown). Linkspans 240, 242 may then be utilized to extend the surface 216 of deck 202 to the adjacent shoreline to establish points of ingress and egress for the floating refueling facility 200.

Again, deck surface 216 may include first angled extension 218 projecting away from first corner 210 and a second angled extension 220 projecting away from the second corner 214 with linkspan 240, 242 coupled to extensions 218, 220, respectively.

An enclosure 226 extends around a storage area defined by perimeter 227 for securing fuel container assemblies 70. In one or more embodiments, a fuel container depression 244 may be formed in upper deck surface 216 within the perimeter 227 of enclosure 226, with a plurality of fuel container assemblies 70 disposed within the fuel container depression 244. As on gas supply marine vessel 10, one or more gas interface modules 42 may be positioned in enclosure 226 for fluidically connecting a plurality of fuel container assemblies 70. Thus, it will be appreciated that such a system is readily scalable so that a comparatively large volume of gas may be delivered and stored at floating refueling facility 200 without the need for the infrastructure and investment required of more permanent gas storage facilities. Likewise, the storage capacity of floating refueling facility 200 can easily be increased as demand dictates. This is particularly true since gas interface modules 42 may have multiple levels to accommodate stacked fuel container assemblies 70.

A blast wall 228 extending along at least a portion 229 of the perimeter 227 shields vehicles, such as vehicles 250 and 252, on floating refueling facility 200 in refueling area 231 and/or cargo loading area 230. One or more fuel dispensers 236 may be disposed along enclosure 226 adjacent refueling area 231.

In one or more embodiments, fuel handling equipment 256 may be carried by deck 202, rendering floating refueling facility 200 as self-contained.

Figure 19:
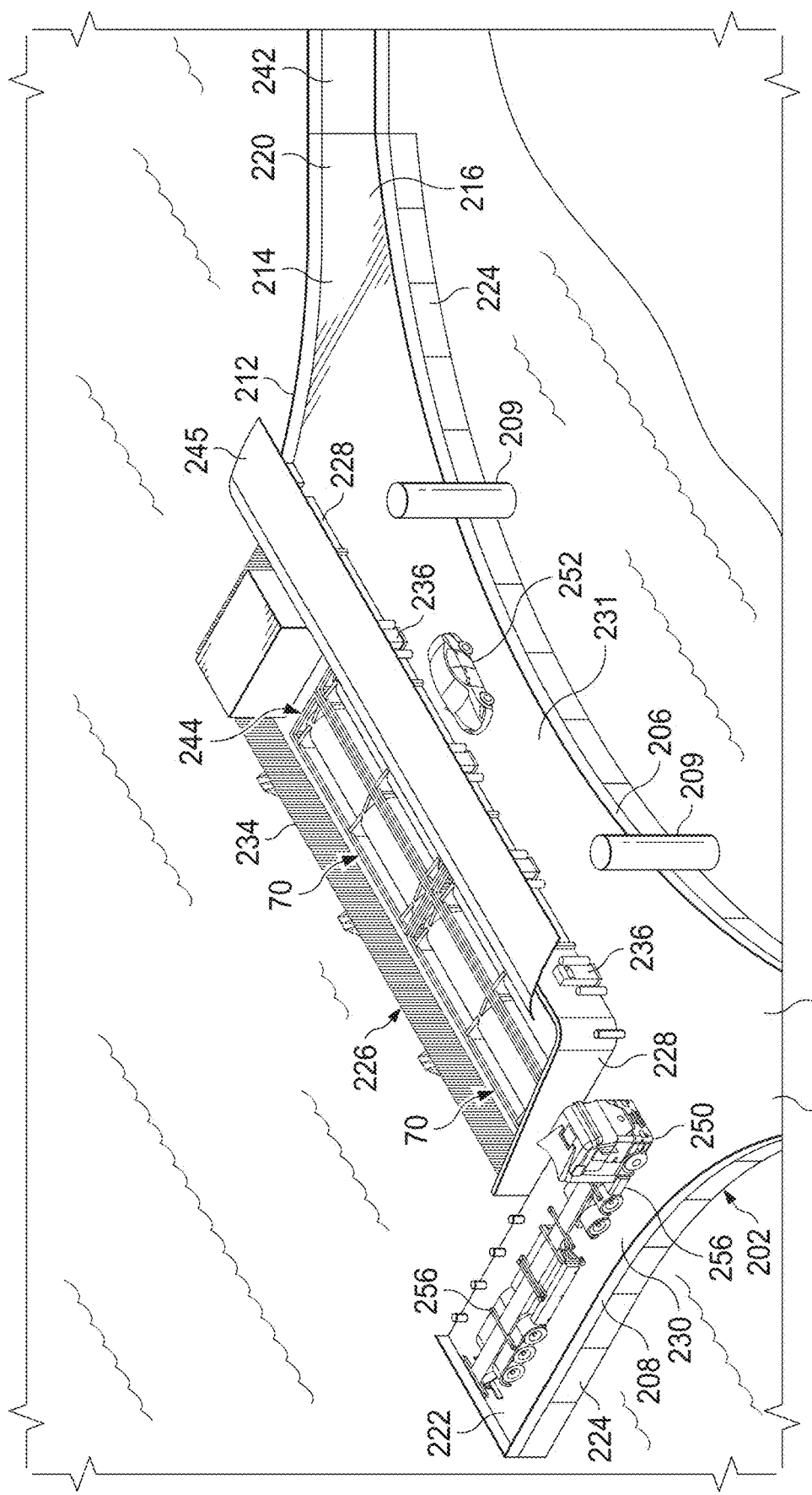
Figure 20:
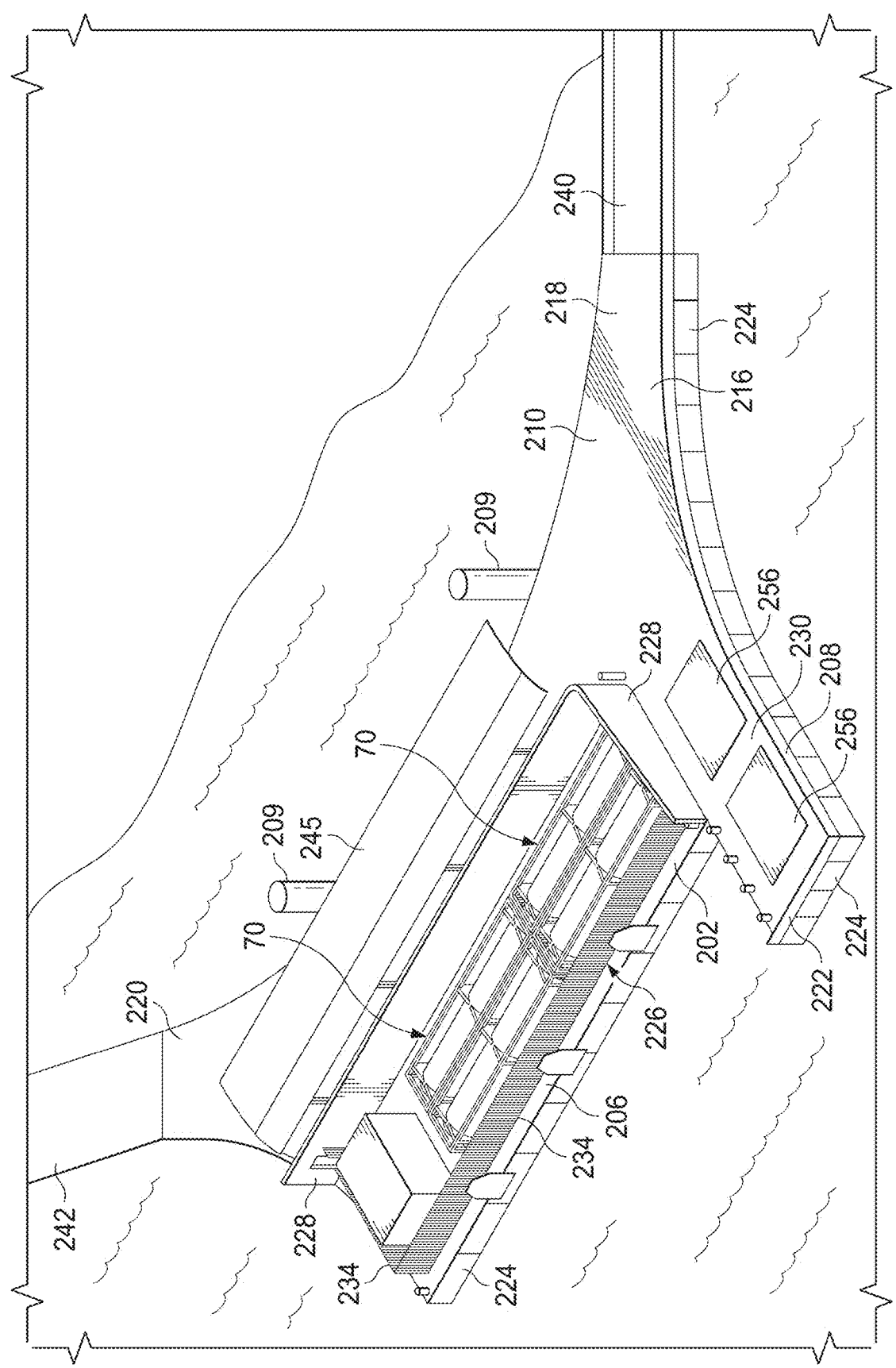

FIGS. 19 and 20 are perspective views of the floating refueling facility 200 of FIG. 18. In this embodiment, floating refueling facility 200 includes a first linkspan 240 attached to the first angled extension 218 and a second linkspan 242 attached to the second angled extension 220. Each linkspan 240, 242 may be pivotally coupled to deck 202 to accommodate changing tides and the rise and fall of deck 202. The angled nature of the linkspans 240, 242 promote ease of ingress and egress from floating refueling facility 200, particularly given the parabolic shaped second side 206 and curved ends 208, 212. As can be seen in FIG. 19, the L-shaped extension 222 of upper deck surface 216 permits loading area 230 and any cargo vehicle 250 to be spaced apart from refueling area 231 so as not to inhibit ingress and egress from floating refueling facility 200. As described above, in one or more embodiments, a blast wall 228 may be provided to protect cargo loading area 230 and any cargo vehicle 250 parked in cargo loading area 230.

Figure 21A:
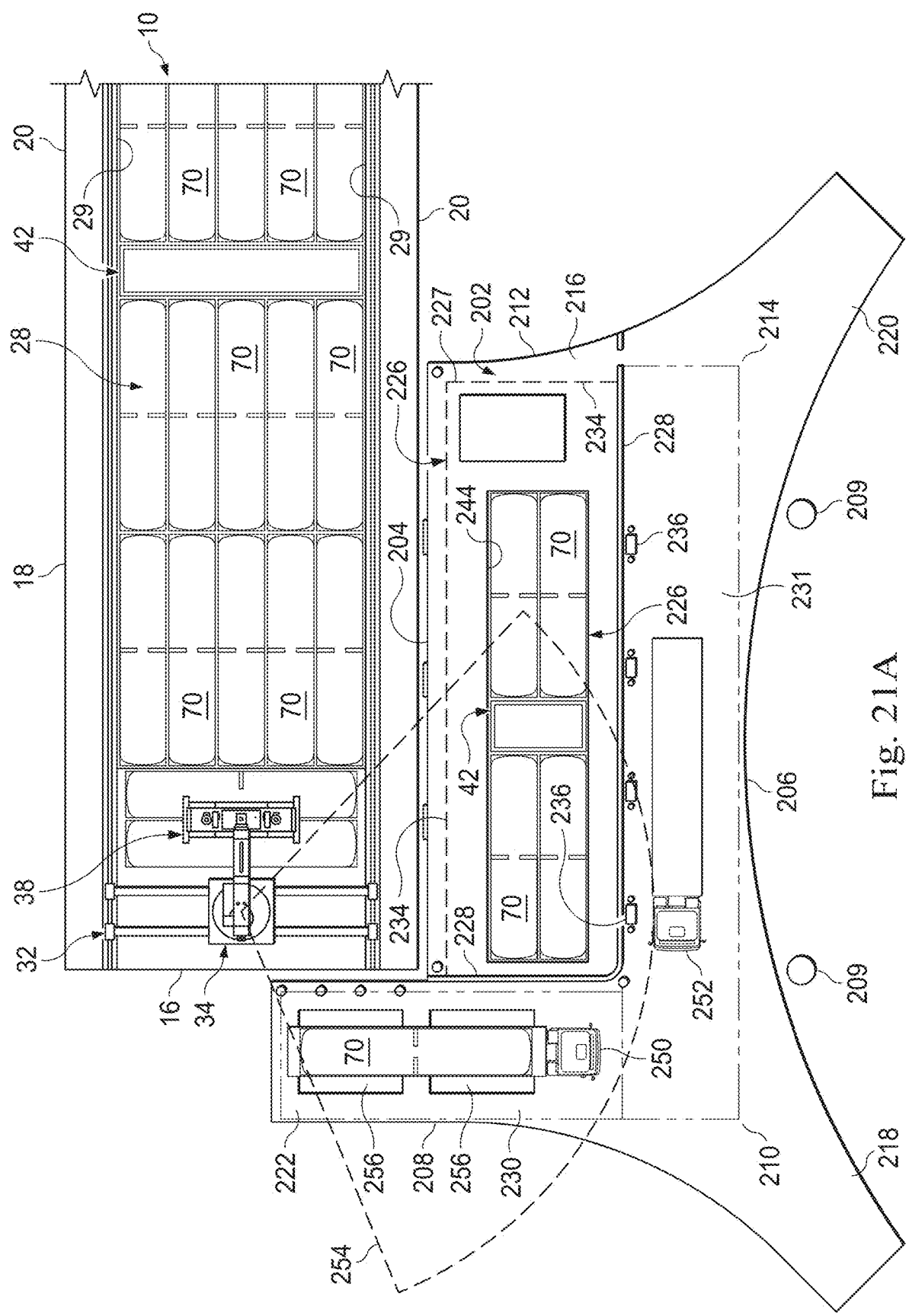
Figure 21B:
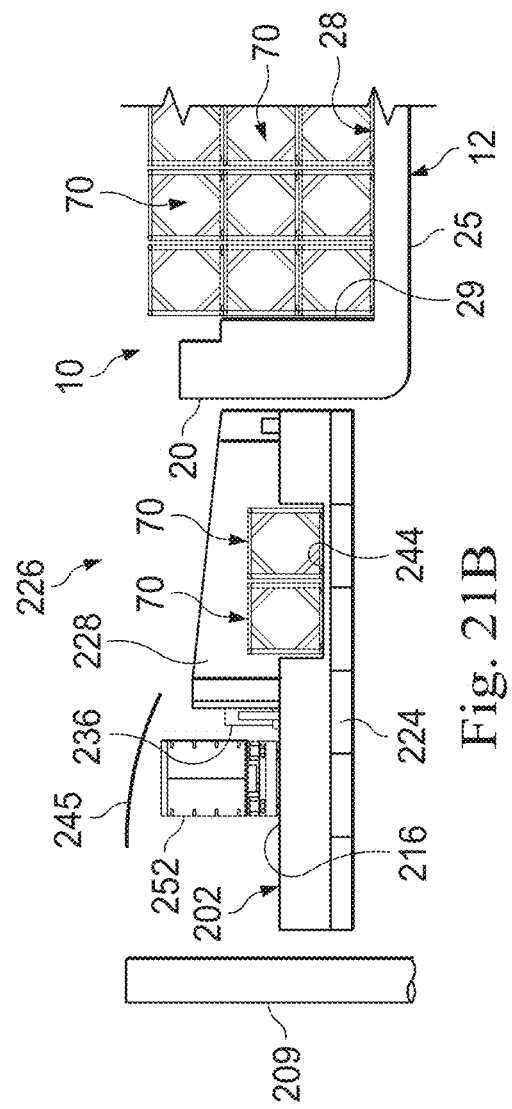
Figure 21C:
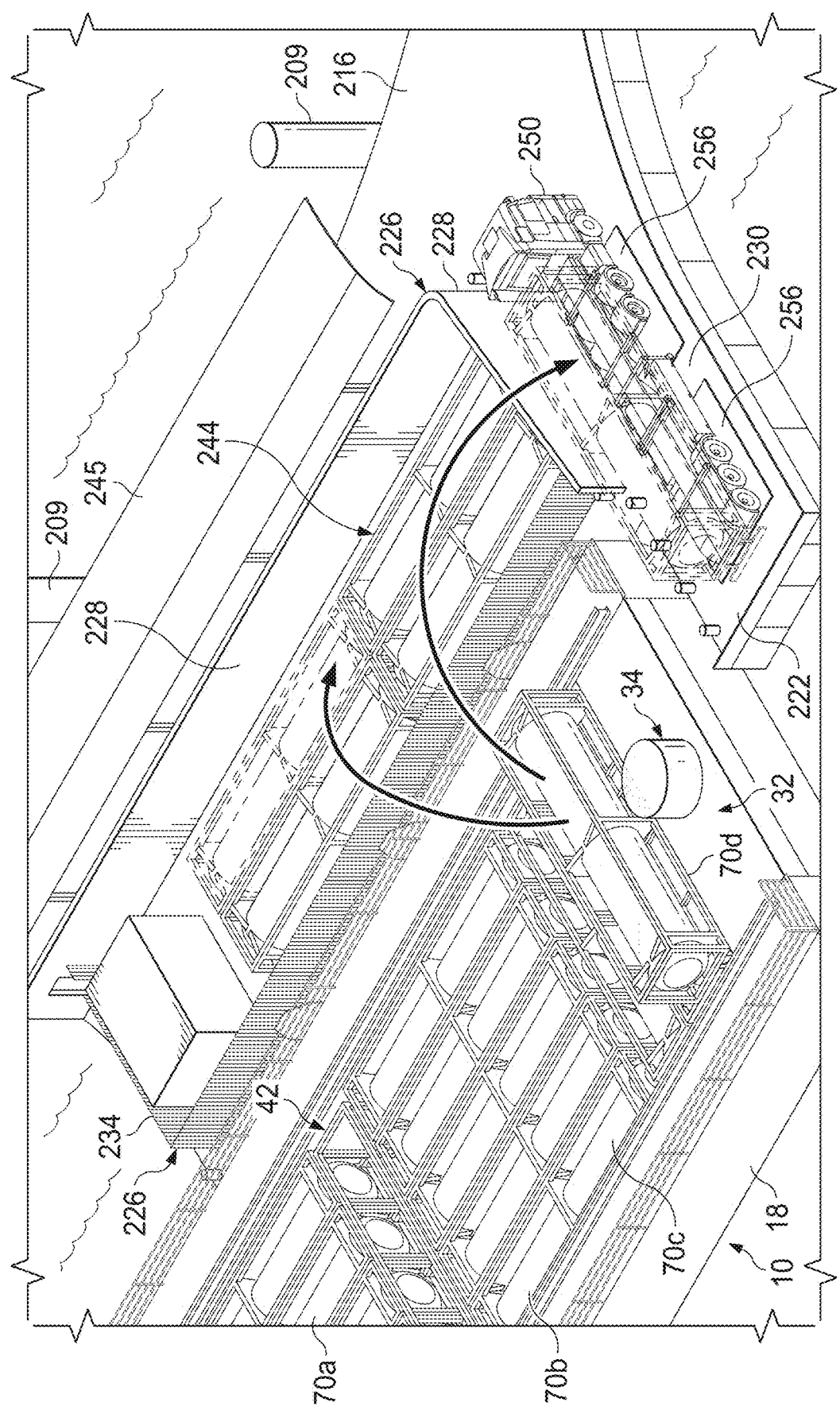
FIG. 21c is a perspective view of a gas supply marine vessel docked at a floating refueling facility illustrating the functionality of the fuel container assemblies.

FIGS. 21a, 21b and 21c are various partial views of a gas supply marine vessel 10 docked at a floating refueling facility 200. In FIGS. 21a and 21c, the stern end 16 of gas supply marine vessel 10 is shown adjacent L-shaped extension 222 of upper deck surface 216. Fuel container assemblies 70 are illustrated in a stacked arrangement in cargo cavity 28 of hull 12 of gas supply marine vessel 10. In FIG. 21a, gantry assembly 32 of gas supply marine vessel 10 is shown positioned adjacent stern end 16 of gas supply marine vessel 10. In this position, as illustrated by arc 254, in some embodiments, articulating crane 34 has a reach that extends both to the cargo loading area 230 as well as to fuel container depression 244. As such, fuel container assemblies 70 can be readily moved between gas supply marine vessel 10, cargo vehicle 250 and fuel container depression 244, enhancing the flexibility of floating refueling facility 200. For example, articulating crane 34 can be utilized to remove an empty fuel container assembly 70 from cargo vehicle 250 and store the empty fuel container assembly 70 on gas supply marine vessel 10 for transport. Then articulating crane 34 may be utilized to move a full fuel container assembly 70 from either gas supply marine vessel 10 or fuel container depression 244 to cargo vehicle 250. Likewise, empty fuel container assemblies 70 can be removed from fuel container depression 244 and loaded onto gas supply marine vessel 10, and full fuel container assemblies 70 can be moved from upper deck 26 of gas supply marine vessel 10 to the storage area defined by perimeter 227 of floating refueling facility 200. FIG. 21b is a partial cross-section of floating refueling facility 200 showing stacked fuel container assemblies 70 carried in the cargo cavity 28 of gas supply marine vessel 10, secured by cavity sides 29, and fuel container assemblies 70 positioned within the fuel container depression 244 formed in upper deck surface 216 of deck 202. In this illustration, a vehicle 252 is shown disposed for refueling at a fuel dispenser 236. A canopy 245 extends partially over refueling area 231. Blast walls 228 are shown disposed between fuel container depression 244 and any area where a vehicle might be parked.

Figure 22:
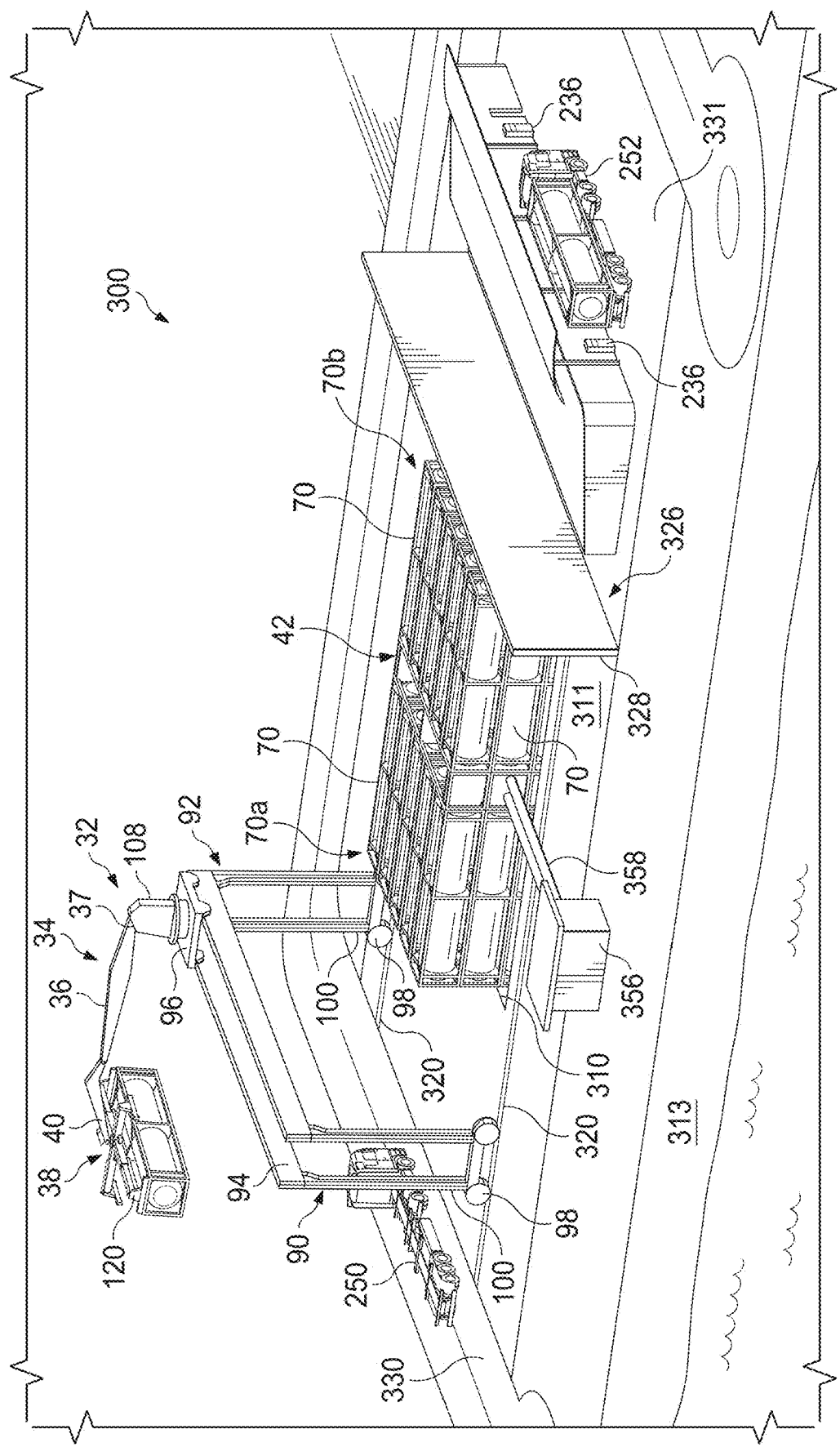
FIG. 22 is a perspective view of a land-based refueling facility having stacked fuel container assemblies fluidically coupled to a gas interface module.
Figure 23:
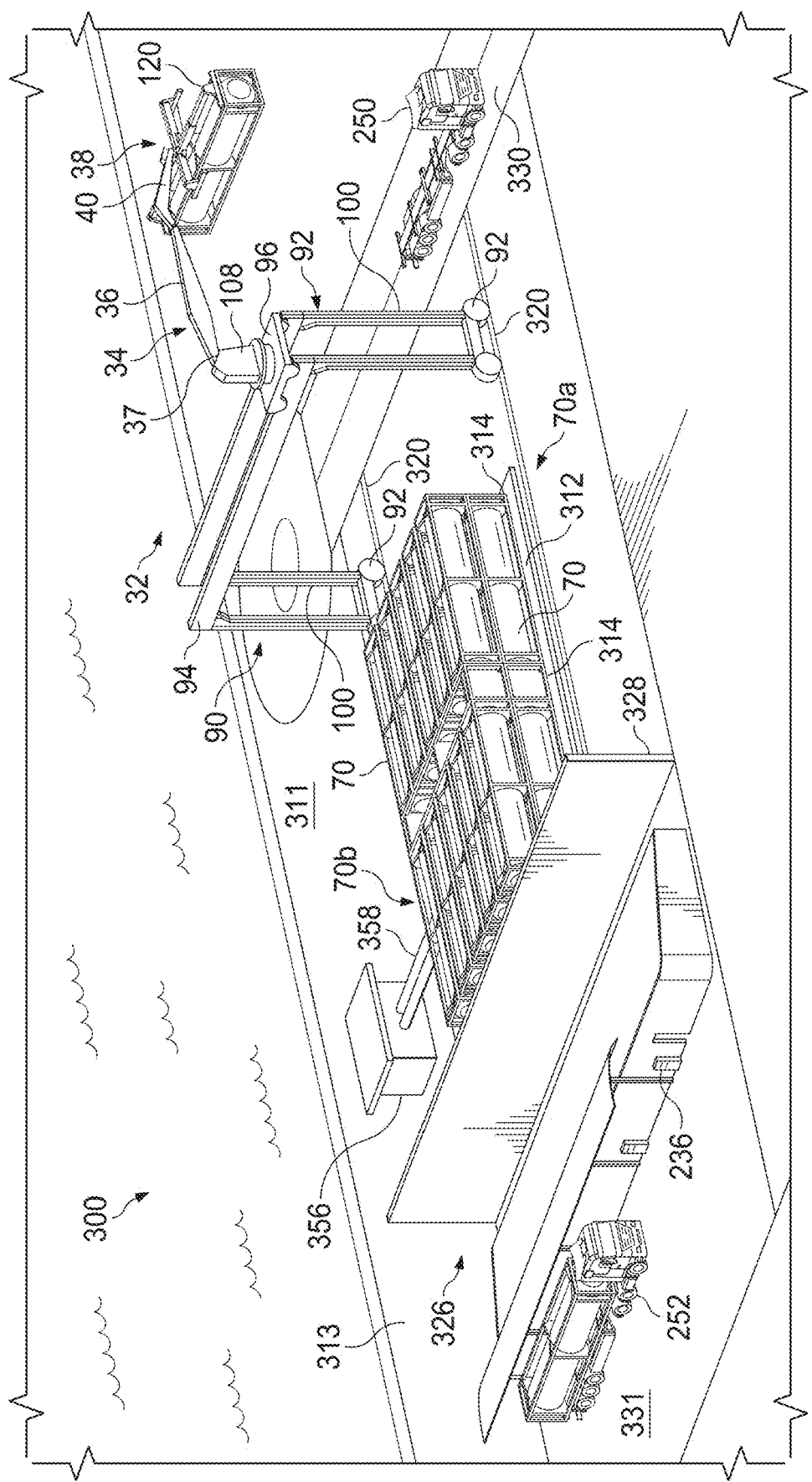
FIG. 23 is another perspective view of land-based refueling facility of FIG. 22.

In operation gas supply marine vessel 10 is loaded with a plurality of fuel container assemblies 70 at a dock, an LNG terminal or similar gas loading facility. The articulating crane 34 carried on gantry assembly 32 has sufficient reach and radius to engage and lift fuel container assemblies 70 stacked on a dock or otherwise carried on a vehicle 250 and place the fuel container assemblies 70 within the open cargo cavity 28. In one or more embodiments, fuel container assemblies 70 are positioned within open cargo cavity 28 so that the ports 75a, 75b of a fuel vessel 74 are adjacent fuel connection lines 60a, 60b carried on frame 44 of a gas interface module 42. Thus, for gas interface module 42 that has multiple levels 62 with a plurality of spaced apart fuel vessel docking stations 54 positioned vertically and laterally on a frame 44, fuel container assemblies 70 may be placed sided by side, and also stacked vertically, in order to position a fuel container assembly 70 adjacent each fuel vessel docking station 54. In one or more embodiments where fuel is to be bulk offloaded or discharged to a storage facility, such as an on-shore storage container or to the storage vessel of an adjacent ship, each fuel vessel 74 is fluidically coupled to the adjacent gas interface module 42 so that the fuel container assemblies 70 are all in fluid communication with the pipe manifold 56 of the gas interface module 42. In other embodiments, where fuel container assemblies 70 are to be offloaded from gas supply marine vessel 10, fuel container assemblies 70 may be positioned in cargo cavity 28 without fluidically coupling the fuel vessel 74 to the fuel connection lines 60a, 60b. In some embodiments, regardless of whether fuel container assemblies 70 are fluidically coupled to a gas interface module 42, fuel container assemblies 70 may still be physically attached to gas interface module 42, such as with a lock or other attachment mechanism, to secure fuel container assemblies 70 during transport. In any event, once gas supply marine vessel 10 has arrived at a location for offloading, fuel container assemblies 70 that are not fluidically coupled to a gas interface module 42 onboard gas supply marine vessel 10 may be offloaded utilizing articulating crane 34 and gantry assembly 32. For example, the second location may be a refueling facility, such as a land-based fuel storage container, a pier or the above described floating refueling facility 200. Moreover, in some embodiments, at the second location, the gas interface module 42 onboard gas supply marine vessel 10 may be fluidically coupled to a fuel storage container at the second location, and the liquified gas from the fuel container assemblies 70 fluidically coupled to the onboard gas interface module 42 may be offloaded via the onboard gas interface module 42. In one or more embodiments, at the second location, fluid communication may be established between the onboard gas interface module 42 and a gas interface module 42 at the second location, and a plurality of fuel container assemblies 70 at the second location that are coupled to the gas interface module 42 at the second location can be filled. In some embodiments, this may be the case where a portion of fuel container assemblies 70 are to be offloaded onto a vehicle or dock, such as floating refueling facility 200, while a portion of fuel container assemblies 70 remaining onboard gas supply marine vessel 10 are used to refill depleted fuel container assemblies 70 already present at the dock. It will be appreciated that articulating crane 34 may further be utilized to on-load empty fuel container assemblies 70 onto gas supply marine vessel 10, whether from a floating refueling facility 200, a transport vehicle or other dockside location. It will be appreciated that the above described gas supply marine vessel 10 is rugged and versatile, allowing bulk delivery of a large volume of LNG or LPG to locations not otherwise accessible by pipeline or vehicle or larger LNG or LPG ships (which typically require deep harbors or offshore mooring facilities), while protecting the fuel cargo from damage during rough seas between locations of call. Likewise, a floating refueling facility 200 for gas storage may quickly and easily be deployed without the difficulty of installing more permanent on-shore gas storage facilities. Turning to FIGS. 22 and 23, another embodiment a refueling facility 300 is shown and generally depicted as a land-based refueling facility 300. In the illustrated embodiment, refueling facility 300 includes at least one gas interface module 42 as generally described above. In some embodiments, depending on the footprint of refueling facility 300 and liquified gas storage requirements for refueling facility 300, refueling facility 300 may include a plurality of gas interface modules 42. Each gas interface module 42 is disposed to be fluidically coupled to a plurality of fuel container assemblies 70 positioned adjacent the gas interface module 42. Thus, as show, a plurality of fuel container assemblies 70 are positioned adjacent gas interface module 42 and fluidically coupled to gas interface module 42. In the illustrated embodiment, each of a plurality of fuel container assemblies 70 is separately coupled to gas interface module 42. In one or more embodiments, fuel container assemblies 70 may be stacked in columns and may be arranged adjacent one another in rows to form a set of fuel container assemblies 70, with each of a plurality of fuel container assemblies 70 in a set fluidically coupled separately to the gas interface module 42. In FIGS. 22 and 23, one gas interface module 42 is shown, with a first set 70a and a second set 70b of fuel container assemblies 70 fluidically coupled to opposing sides of gas interface module 42.

In one or more embodiments, a fuel container depression 310 may be formed at refueling facility 300. The fuel container depression 310 may be elongated and rectangular, with a gas interface module 42 extending across the fuel container depression 310. For the avoidance of doubt, a fuel container depression 310 as described herein may be any cavity formed in a surface and extending below the surface. In the illustrated embodiment, fuel container depression 310 is formed in ground surface 311. In one or more embodiments, the fuel container depression 310 may have a depth of at least a portion of the height of a fuel container assembly 70. In other embodiments, the fuel container depression 310 has a depth of at least approximately one-half of the height of a fuel container assembly 70.

Fuel container depression 310 functions to secure and partially protect fuel container assemblies 70 disposed therein. In addition, fuel container depression 310 may function to contain any type of spillage that might occur from fuel container assemblies 70. Finally, fuel container depression 310 may function as a partial barrier between fuel container assemblies 70 and any vehicles that might be present in the vicinity of refueling facility 300.

In one or more embodiments, a landing platform 312 may be provided for receipt of a fuel container assemblies 70. While landing platform 312 may be deployed on ground surface 311, in embodiments where a fuel container depression 310 is formed, landing platform 312 may be disposed within a fuel container depression 310. As contemplated herein, landing platform 312 is a weight bearing base of metal or concrete, such as a reinforced concrete pad, disposed to evenly distribute the weight of a plurality of fuel container assemblies 70. One or more gas interface modules 42 may also be disposed on landing platform 312. As described above, in one or more embodiments, fuel container assembly 70 is sized in accordance with ISO dimensions and landing platform 312 is accordingly disposed to receive ISO tank containers. As such, landing platform 312 may include an engagement mechanism 314 disposed at one or more corners to secure a fuel container assembly 70 to landing platform 312 adjacent gas interface module 42.

In one or more embodiments, refueling facility 300 may include a gantry assembly 32 disposed to move adjacent fuel container assemblies 70 and gas interface module(s) 42. In some embodiments, gantry assembly 32 may straddle a stack of fuel container assemblies 70 disposed at refueling facility 300. In this regard, where the fuel container assemblies 70 are disposed in a fuel container depression 310, gantry assembly 32 straddles the fuel container depression 310 and may be movable along at least a portion of the length of the fuel container depression 310. In any event, gantry assembly 32 may generally include a first support leg system 90 spaced apart from a second support leg system 92 with one or more bridge girders 94 extending between the first and second support leg systems 90, 92, thereby permitting gantry assembly 32 to straddle fuel container depression 310. In this regard, regardless of whether a fuel container depression 310 is provided, support legs 90, 92 are of sufficient height to allow gantry assembly 32 to move freely above gas interface module 42 and fuel container assemblies 70 without interference from gas interface modules 42 or fuel container assemblies 70.

In one or more embodiments, a track 320 may extent adjacent fuel container assemblies 70 and gas interface module(s) 42 to guide gantry assembly 32. In one or more embodiments, a track 41 may be provided adjacent each side of fuel container depression 310 and/or landing platform 312. In one or more embodiments, gantry assembly 32 includes a guide mechanism 98 mounted on a distal end 100 of each support leg assembly 90, 92, each guide mechanism 98 disposed to engage a track 320. Although not limited to a particular configuration, in one or more embodiments, track 320 is a linear rail or linear depression or linear curb and guide mechanism 98 is a wheel. In another embodiment, track 320 is a linear rack and guide mechanism 98 is a pinion. In some embodiments, such track(s) 320 may extend from adjacent fuel container assemblies 70 and/or gas interface module(s) 42 to a cargo loading area 330. Cargo loading area 330 may be disposed for receipt of a cargo vehicle 250 capable of carrying a fuel container assembly 70 as described herein.

As described above, in one or more embodiments, an articulating crane 34 is mounted on the gantry assembly 32. Articulating crane 34 includes a boom 36 with a first end 37 pivotally attached to the gantry assembly 32 and a cargo engagement mechanism 38 attached to the second end 40 of the boom 36. Articulating crane 34 is mounted along bridge girder(s) 94. In one or more embodiments, a sled 96 is slidably mounted on the bridge girder(s) 94, with articulating crane 34 pivotally mounted to sled 96. Being slidably mounted, sled 96 can move between support leg systems 90, 92, while in some embodiments, articulating crane 34 can pivot 360 degrees, permitting articulating crane 34 maximum reach for manipulating a fuel container assembly 70.

Although not limited to a particular configuration, in one or more embodiments, articulating crane 34 is a knuckle crane. In any event, articulating crane 34 may comprise a rotatable base 108 to which the first end 37 of boom 36 is attached. In one or more embodiments, cargo engagement mechanism 38 is a spreader assembly 120. Although a gantry assembly 32 and articulating crane 34 have been described as a mechanism for moving fuel container assemblies 70 between gas interface module 42 and a cargo vehicle 250 in cargo loading area 330, it will be appreciated that in other embodiments, other types of cranes, or other types of cargo handling equipment may be utilized, including without limitation, truck mounted cranes, bridge/overhead cranes, telescoping cranes, tower cranes, loader cranes, other types of port cranes and forklifts Refueling facility 300 may include a refueling area 331 spaced apart from the gas interface module(s) 42 and fuel container assemblies 70. One or more fuel dispensers 236 may be disposed along an enclosure 326 extending between the fuel dispensers 236 and the fuel container assemblies 70. In some embodiments, a portion of enclosure 336 may be a blast wall 328 separating refueling area 331 from gas interface module(s) 42 and fuel container assemblies 70. In one or more embodiments, cargo loading area 330 is positioned on one side of blast wall 328 and refueling area 331 is positioned on an opposite side of blast wall 328.

Gas interface module 42 may be fluidically coupled to fuel handling equipment 356. In one or more embodiments, fuel handing equipment 356 may be spaced apart from the gas interface module 42 and fuel container assemblies 70 and one or more fuel transmission lines 358 may interconnect fuel handling equipment 356 and gas interface module 42. For example, fuel handling equipment may be positioned adjacent a dock or pier 313. In some embodiments, fuel handling equipment 256 includes a compressor. In some embodiments, fuel handling equipment 256 includes pump. In some embodiments, refueling facility 300 may be generally located along a shoreline adjacent a docket or pier 313, permitting refueling facility 300 to receive a gas supply marine vessel (not shown), which in some embodiments, may be gas supply marine vessel 10 described above.

In such embodiments, fuel handling equipment 356 may be utilized to transfer bulk fuel from fuel container assemblies 70 carried on gas supply marine vessel 10 to fuel container assemblies 70 fluidically coupled to gas interface module(s) 42 of refueling facility 300.

In operation, gantry assembly 32 of refueling facility 300 may be utilized to move fuel container assemblies 70 between cargo vehicle 250 and the gas interface module 42 of refueling facility 300. Specifically, gantry assembly 32 may remove an empty or depleted fuel container assembly 70 from a cargo vehicle 250 and position the empty fuel container assembly 70 adjacent gas interface module 42 for refilling, and gantry assembly 32 may move a fuel container assembly 70 charged with fuel from adjacent the gas interface module 42 to the cargo vehicle 250. In this way, gas interface module(s) 42 can receive bulk fuel from a gas supply marine vessel and distribute the fuel to empty fuel container assemblies 70 at the refueling facility 300, which fuel container assemblies 70, once filled, are ready to be loaded once again on a cargo vehicle 250.

Fuel dispensers 236 may also be used to provide fuel to a vehicle 252 requiring refueling or a vehicle 252 carrying a fuel container assembly 70. Thus, in this way, a fuel container assembly 70 in refueling area 331 may be refilled without fluidically coupling the fuel container assembly 70 to gas interface module 42 or removing the fuel container assembly 70 from vehicle 252. The same is true for the above described refueling facility 200 as well. Thus, a gas supply marine vessel has been described. In one or more embodiments, the gas supply marine vessel generally includes a buoyant, elongated hull with a first hull side and an opposing second hull side, a first hull end and a second hull end, each hull side having an upper edge; an upper deck extending between the hull sides with an elongated cargo cavity formed within the upper deck between the two hull sides; a multi-deck, enclosed accommodation structure at the first end of the hull; a gantry assembly straddling the cargo cavity between the two hull sides, the gantry assembly movable relative to the two sides along at least a portion of the length of the hull; an articulating crane mounted on the gantry assembly, the articulating crane having a boom with a first end pivotally attached to the gantry assembly and a spreader assembly attached to the second end of the boom; and one or more gas interface modules positioned in the cargo cavity, each gas interface module having an elongated frame extending across the cargo cavity between the first and second hull sides; and a plurality of spaced apart fuel vessel docking stations disposed along the length of at least one frame side. In other embodiments, the gas supply marine vessel generally includes a buoyant, elongated hull with a first hull side and an opposing second hull side, a first hull end and a second hull end, each hull side having an upper edge; an upper deck extending between the hull sides with an open elongated, substantially rectangular cargo cavity formed within the upper deck between the two hull sides; a multi-deck, enclosed accommodation structure at the first end of the hull and extending between the two hull sides; a gantry assembly straddling the cargo cavity between the two hull sides, the gantry assembly movable along at least a portion of the length of cargo cavity; an articulating crane mounted on the gantry assembly, the articulating crane having a boom with a first end pivotally attached to the gantry assembly and a cargo engagement mechanism attached to the second end of the boom; and one or more gas interface modules positioned in the cargo cavity, each gas interface module having an elongated frame having a first elongated side, and opposing second elongated sides, a first end and a second end, the frame extending substantially between the two hull sides; and a plurality of spaced apart fuel vessel docking stations along the length of at least one frame side. In yet other embodiments, the gas supply marine vessel includes a buoyant, elongated hull with a first hull side and an opposing second hull side, a first hull end and a second hull end, each hull side having an upper edge; an upper deck extending between the hull sides with an open elongated, substantially rectangular cargo cavity formed within the upper deck between the two hull sides; a multi-deck, enclosed accommodation structure at the first end of the hull and extending between the two hull sides; an elongated track adjacent the upper edge of each hull side, each track extending along at least a portion of the length cargo cavity; a gantry assembly straddling the cargo cavity between the two hull sides, the gantry assembly movable along at least a portion of the length of cargo cavity and having a first support leg system, a second support leg system spaced apart from the first support leg system, a bridge girder straddling the cargo cavity and extending between the first and second support leg systems, a sled slidably mounted on the bridge girder, and a guide mechanism mounted on a proximal end of each support leg assembly, each guide mechanism cooperating with an adjacent track; an articulating crane pivotally mounted to the sled of the gantry assembly, the articulating crane having a boom with a first end pivotally attached to the gantry assembly and a cargo engagement mechanism attached to the second end of the boom, wherein the cargo engagement mechanism is a spreader assembly having a first arm with a first gripper disposed at a distal end of the first arm and a second arm with an opposing second gripper disposed at a distal end of the second arm, wherein the second arm is movable relative to the first arm. In yet other embodiments, a gas supply marine vessel includes a buoyant, elongated hull with a first hull side and an opposing second hull side, a first hull end and a second hull end, each hull side having an upper edge; an upper deck extending between the hull sides with an elongated cargo cavity formed within the upper deck between the two hull sides; a gantry assembly straddling the cargo cavity between the two hull sides, the gantry assembly movable relative to the two sides along at least a portion of the length of the hull; an articulating crane mounted on the gantry assembly, the articulating crane having a boom with a first end pivotally attached to the gantry assembly and a spreader assembly attached to the second end of the boom; one or more gas interface modules positioned in the cargo cavity, each gas interface module having an elongated frame extending across the cargo cavity between the first and second hull sides; and a plurality of spaced apart fuel vessel docking stations disposed along the length of at least one frame side. In other embodiments, a gas supply marine vessel includes a buoyant, elongated hull with a first hull side and an opposing second hull side, a first hull end and a second hull end, each hull side having an upper edge; an upper deck extending between the hull sides with an open elongated, substantially rectangular cargo cavity formed within the upper deck between the two hull sides; an elongated track adjacent the upper edge of each hull side, each track extending along at least a portion of the length cargo cavity; one or more gas interface modules positioned in the cargo cavity, each gas interface module having an elongated frame extending across the cargo cavity between the first and second hull sides; and a plurality of spaced apart fuel vessel docking stations disposed along at least a portion of the length of at least one frame side; a gantry assembly straddling the cargo cavity between the two hull sides, the gantry assembly movable along at least a portion of the length of cargo cavity and having a first support leg system, a second support leg system spaced apart from the first support leg system, a bridge girder straddling the cargo cavity and extending between the first and second support leg systems, a sled slidably mounted on the bridge girder, and a guide mechanism mounted on a proximal end of each support leg assembly, each guide mechanism cooperating with an adjacent track; an articulating crane pivotally mounted to the sled of the gantry assembly, the articulating crane having a boom with a first end pivotally attached to the gantry assembly and a cargo engagement mechanism attached to the second end of the boom, wherein the cargo engagement mechanism is a spreader assembly having a first arm and a second arm, wherein at least one of the arms is movable relative to the other arm; a plurality of fuel container assemblies, each fuel container assembly fluidically coupled to a separate fuel vessel docking station. In other embodiments, a gas supply marine vessel may include a buoyant, elongated hull with a first hull side and an opposing second hull side, a first hull end and a second hull end, each hull side having an upper edge; an upper deck extending between the hull sides with an elongated cargo cavity formed within the upper deck between the two hull sides; a gantry assembly straddling the cargo cavity between the two hull sides, the gantry assembly movable relative to the two sides along at least a portion of the length of the hull; an articulating crane mounted on the gantry assembly, the articulating crane having a boom with a first end pivotally attached to the gantry assembly and a spreader assembly attached to the second end of the boom; one or more gas interface modules positioned in the cargo cavity, each gas interface module having an elongated frame extending across the cargo cavity between the first and second hull sides, the elongated frame having opposing sides and at least two levels, with a plurality of spaced apart fuel vessel docking stations disposed along each side of the frame at each level; and a plurality of fuel container assemblies stacked on top of one another and adjacent one another to form rows and columns of fuel container assemblies, with at least a portion of the fuel container assemblies fluidically coupled to the gas interface module along each side of the frame at each level, wherein the gas supply marine vessel is a barge.

Likewise, a floating refueling facility has been described. In one or more embodiments, the floating refueling facility may generally include a deck having an elongated first side; an elongated second side opposite the first side where the second side is parabolic in shape; a first end; a second end; an upper deck surface extending between the sides and the ends; at least one float supporting the deck; one or more gas interface modules positioned on the deck, each gas interface module having an elongated frame and a plurality of spaced apart fuel vessel docking stations disposed along the length of at least one frame side; and a plurality of fuel container assemblies adjacent the gas interface module and fluidically coupled to the gas interface module via separate fuel vessel docking stations. In other embodiments, the floating refueling facility may generally include a deck having an elongated first side, an elongated second side opposite the first side, a first end intersecting the second side to form a first corner, a second end intersecting the second side to form a second corner, an upper deck surface extending between the sides and the ends, the upper deck surface including a first angled extension projecting away from first corner and a second angled extension projecting away from the second corner; at least one float supporting the deck; a rectangular enclosure defined by a perimeter and having a blast wall extending along at least a portion of the perimeter closest to the second side; one or more fuel dispensers disposed along the blast wall between the blast wall and the second side of the deck; one or more gas interface modules positioned in the enclosure, each gas interface module having an elongated frame and a plurality of spaced apart fuel vessel docking stations disposed along the length of at least one frame side; and a plurality of fuel container assemblies adjacent the gas interface module and fluidically coupled to the gas interface module via separate fuel vessel docking stations. In yet other embodiments, the floating refueling facility may generally include a deck having an elongated first side, an elongated, parabolic shaped second side opposite the first side with an upper deck surface extending the sides; at least one float supporting the deck; a fuel container depression formed in the upper deck surface between the two sides; an enclosure extending at least partially around the fuel container depression; one or more gas interface modules positioned within the fuel container depression, each gas interface module having an elongated frame and a plurality of spaced apart fuel vessel docking stations disposed along the length of at least one frame side; a plurality of fuel container assemblies positioned within the fuel container depression adjacent gas interface module and fluidically coupled to the gas interface module via separate fuel vessel docking stations; and one or more fuel dispensers disposed along the enclosure between the enclosure and the second side of the deck. In still yet other embodiments, the floating refueling facility may generally include a deck having an elongated first side, an elongated, parabolic shaped second side opposite the first side, a first end intersecting the second side to form a first corner, a second end intersecting the second side to form a second corner, an upper deck surface extending between the sides and the ends, the upper deck surface including a first angled extension projecting away from second side and a second angled extension projecting away from the second side; at least one float supporting the deck; an enclosure defined by a perimeter and having perimeter barrier extending around at least a portion of the perimeter of the enclosure; a fuel container depression formed in the upper deck surface within the perimeter of the enclosure; and at least two fuel container assemblies each movably secured within the fuel container depression. In other embodiments, the floating refueling facility generally includes a deck having an elongated first side, an elongated second side opposite the first side with an upper deck surface extending therebetween; at least one float supporting the deck; a fuel container depression formed in the upper deck surface between the two sides; one or more gas interface modules positioned within the fuel container depression, each gas interface module having an elongated frame and a plurality of spaced apart fuel vessel docking stations disposed along the length of at least one frame side; and a plurality of fuel container assemblies positioned within the fuel container depression adjacent gas interface module and fluidically coupled to the gas interface module via separate fuel vessel docking stations.

For any of the foregoing embodiments, the vessel or station may include any one of the following elements, alone or in combination with each other:

The gas supply marine vessel is a barge.

The gas supply marine vessel is a self-propelled boat.

The second side of the deck is parabolic in shape between the first and second angled extensions.

The second side of deck is concave in shape between the first and second angled extensions.

The first end of the deck extends beyond the elongated first side of the deck forming an L-shaped extension of the upper deck surface.

The deck is curvilinear in shape at the intersection between the first end and the first angled extension, and the deck is curvilinear in shape at the intersection between the second end and the second angled extension.

A plurality of spaced apart floats supporting the deck.

One or more floats extending along each of the sides and ends of the deck.

The floats are pontoons.

The floats are inflatable.

The floats are rigid.

The at least one float is a barge.

The at least one float is a barge extending between the sides and the ends of the deck.

A plurality of fuel dispensers disposed along the blast wall between the blast wall and the second side of the deck.

The perimeter of the enclosure adjacent the first side is spaced apart from the first side to form a loading dock between the enclosure and the first side.

The blast wall extends along at least a portion of the perimeter of the enclosure closest to the first end.

The blast wall closest to the second side extends along the length of the enclosure to adjacent the second end of the deck.

A fence extending around the portion of the perimeter that does not have a blast wall positioned therealong.

A fuel container depression formed in the upper deck surface within the perimeter of the enclosure.

The fuel container depression is elongated and rectangular.

The blast wall closest to the second side extends at least along the length of the fuel container depression.

The blast wall closest to the first end extends at least along the width of the fuel container depression.

Fuel handling equipment carried by the deck.

The fuel handling equipment is carried by the deck below the upper deck surface.

The fuel handling equipment is carried by the deck below the upper deck surface adjacent the L-shaped extension of the upper deck surface The fuel handling equipment is a compressor.

The fuel handling equipment is a pump.

The fuel handling equipment is carried by the deck within the perimeter of the enclosure.

A canopy extending from the blast wall over the one or more fuel dispensers.

At least one fuel container assembly disposed within the perimeter of the enclosure.

At least one fuel container assembly disposed within the perimeter of the enclosure adjacent the blast wall.

At least one fuel container assembly disposed within the fuel container depression.

A plurality of fuel container assemblies disposed within the fuel container depression.

The fuel container assemblies are positioned adjacent the gas interface module and fluidically coupled to the gas interface module.

A pipe manifold fluidically connecting a fuel container assembly and at least one fuel dispenser.

The fuel container assembly comprises a frame and a fuel vessel mounted on the frame.

The fuel container assembly frame extends around the pressurized fuel vessel.

The fuel container assembly frame is elongated and has an upper frame portion, a lower frame portion, side frame portions and end frame portions.

The fuel container assembly frame is rectangular and defines a volume within the frame in which the fuel vessel is mounted.

The fuel container assembly frame surrounds the fuel vessel.

The fuel container assembly frame is stackable on other frames.

The fuel container assembly frame is approximately 6 meters in length.

The fuel container assembly frame is approximately 12 meters in length.

The fuel container assembly frame is approximately 14 meters in length.

The fuel container assembly frame is approximately 2.5 meters wide.

A plurality of fuel container assemblies stacked on top of one another adjacent the gas interface module, with at least the lower most fuel container assembly fluidically coupled to the gas interface module.

A plurality of fuel container assemblies stacked on top of one another adjacent the gas interface module, with at least the lower most two fuel container assemblies in the stack fluidically coupled to the gas interface module.

A plurality of fuel container assemblies stacked on top of one another and adjacent one another to form rows and columns of fuel container assemblies, with at least a portion of the lower most fuel container assemblies fluidically coupled to the gas interface module.

A plurality of fuel container assemblies stacked on top of one another and adjacent one another to form rows and columns of fuel container assemblies, with at least a portion of the fuel container assemblies fluidically coupled to the gas interface module.

One or more gas interface modules positioned in the cargo cavity, each gas interface module having an elongated frame extending across the cargo cavity between the first and second hull sides, the elongated frame having opposing sides and at least two levels, with a plurality of spaced apart fuel vessel docking stations disposed along each side of the frame at each level; and a plurality of fuel container assemblies stacked on top of one another and adjacent one another to form rows and columns of fuel container assemblies, with at least a portion of the fuel container assemblies fluidically coupled to the gas interface module along each side of the frame at each level.

The fuel vessel is cylindrical.

The fuel vessel is elongated and cylindrical.

The fuel vessel is a bi-lobe.

The fuel vessel is pressurized.

The fuel vessel is a liquified natural gas fuel vessel.

The fuel vessel is a liquified petroleum gas fuel vessel.

The fuel vessel is a double walled having an inner wall and an outer wall with insulation disposed between the inner and outer walls.

An open, elongated, substantially rectangular cargo cavity formed within the upper deck between the two hull sides.

The cargo cavity has a depth equal to or greater approximately the height of a fuel container assembly.

The cargo cavity has a depth of approximately the height of two stacked fuel container assemblies.

The gas interface module further comprises a pipe manifold with a gather pipe extending along substantially the length of the frame and fluidically connecting the docking stations.

The docking stations each comprises at least one fuel vessel connection line fluidically connected to the gather pipe.

The docking stations each comprises two fuel vessel connection lines fluidically connected to the gather pipe.

Each docking station comprises a loading/discharge fuel vessel connection line and a vapor return fuel vessel connection line.

The gas interface module frame has at least two spaced apart levels.

The gas interface module frame has at least three spaced apart levels.

The gas interface module frame has a plurality of spaced apart levels.

Each level of the gas interface module frame comprises a walkway extending between the two frame ends.

Each level of the gas interface module frame comprises a walkway extending between the two frame ends with each fuel vessel docking station for a level positioned above the walkway.

The fuel vessel connection lines are spaced apart along the length of the gather pipe.

The fuel vessel docking stations are spaced apart along the length of the gather pipe.

The gas interface module has three levels, each level having a gather pipe extending along substantially the length of the frame and a plurality of spaced apart fuel vessel docking stations, each fuel vessel docking station at each level having a fuel vessel connection line fluidically connected to the gather pipe on that level.

At least five fuel vessel docking stations at each level.

The gas interface module further comprises a pump carried by the frame and in fluid communication with the pipe manifold.

The gas interface module further comprises a plurality of spaced apart fuel vessel docking stations along the length of both frame sides.

A fuel container assembly fluidically coupled to a fuel vessel docking station.

A fuel container assembly removably coupled to a fuel vessel docking station.

A plurality of fuel vessel docking stations, each fuel vessel docking station having a separate fuel container assembly fluidically coupled thereto.

A plurality of spaced apart fuel vessel docking stations extending across the cargo cavity between the two hull sides, each fuel vessel docking station having a separate fuel container assembly fluidically coupled thereto.

A plurality of vertically spaced apart fuel vessel docking stations, each fuel vessel docking station having a separate fuel container assembly fluidically coupled thereto.

A gantry assembly; and an articulating crane mounted on the gantry assembly, the articulating crane having a boom with a first end pivotally attached to the gantry assembly and a cargo engagement mechanism attached to the second end of the boom.

The gantry assembly comprises a first support leg system, a second support leg system spaced apart from the first support leg system, a bridge girder straddling the cargo cavity and extending between the first and second support leg systems, wherein the articulating crane is mounted along the bridge girder.

The gantry assembly further comprises a sled slidably mounted on the bridge girder, wherein the articulating crane is pivotally mounted to the sled.

A track extending adjacent each of the first hull side and second hull side along at least a portion of the length of cargo cavity.

The gantry assembly further comprises a guide mechanism mounted on a proximal end of each support leg assembly, each guide mechanism engaging a separate track extending along the cargo cavity.

The track is a rail.

The guide mechanism comprises wheels.

The guide mechanisms each comprise a pinion gear and the tracks each comprise a linear rack.

The articulating crane is a knuckle crane.

The articulating crane comprises a rotatable base, a first arm having a first end pivotally attached to the base and a second end, and a second arm having a first end pivotally attached to the second end of the first arm and a second end, with a cargo engagement mechanism attached to the second end of the second arm.

The cargo engagement mechanism comprises a spreader assembly.

The cargo engagement mechanism comprises a first arm with a first gripper disposed at a distal end of the first arm and a second arm with an opposing second gripper disposed at a distal end of the second arm, wherein the second arm is movable relative to the first arm.

The cargo engagement mechanism comprises an elongated base having a first end and a second end with a first gripper assembly at the first end of the elongated base and an opposing second gripper assembly at the second end of the elongated base.

At least one gripper assembly is movable relative to the other gripper.

A first arm with a first gripper disposed at a distal end of the first arm, the first arm telescopically extending from the first end of the elongated base and a second arm with an opposing second gripper disposed at a distal end of the second arm, the second arm telescopically extending from the second end of the elongated base.

The elongated base is a tube.

The first and second arms are telescopically movable relative to one another.

A fuel container depression formed in the upper deck surface between the two sides.

An enclosure extending at least partially around the gas interface modules.

At least a portion of the enclosure between the gas interface modules and the second side is a blast wall.

The gas interface module frame has at least two spaced apart levels with spaced apart docking stations disposed along each level, the refueling facility further comprising a plurality of fuel container assemblies adjacent the gas interface module, the fuel container assemblies stacked on top of one another and adjacent one another to form rows and columns of fuel container assemblies, with at least a portion of the fuel container assemblies fluidically coupled to the adjacent gas interface module.

The fuel container assemblies each comprise a frame to enable the fuel container assemblies to be stacked, and an elongated, cylindrical, double-walled, insulated fuel vessel at least approximately 6 meters in length and at least approximately 2 meters in width carried by the frame.

A plurality of fuel dispensers disposed along the blast wall between the blast wall and the second side of the deck.

The first end of the deck extends beyond the elongated first side of the deck, forming an L-shaped extension of the upper deck surface.

The first end intersects the second side to form a first corner, and the second end intersects the second side to form a second corner; and further comprising a first linkspan pivotally attached to the first corner and angularly extending angled away from the first corner; and a second linkspan pivotally attached to the second corner and angularly extending angled away from the second corner.

A first linkspan pivotally attached to the deck at the first corner and angularly extending angled away from the first corner; and a second linkspan pivotally attached to the deck at the second corner and angularly extending angled away from the second corner.

The first end is curvilinear in shape at the intersection with the first linkspan and the second end is curvilinear in shape at the intersection with the second linkspan.

A first linkspan pivotally attached to the deck at the first corner and angularly extending angled away from the first corner; and a second linkspan pivotally attached to the deck at the second corner and angularly extending angled away from the second corner; wherein the first end is curvilinear in shape at the intersection with the first linkspan and the second end is curvilinear in shape at the intersection with the second linkspan.

A portion of the enclosure between gas interface module and the second side of the deck is a blast wall and a portion of the enclosure between the gas interface module and the first end is a blast wall.

At least a portion of the enclosure adjacent each of the cargo loading area and the refueling area is a blast wall.

A first linkspan pivotally attached to the deck at the first corner and angularly extending angled away from the first corner; and a second linkspan pivotally attached to the deck at the second corner and angularly extending angled away from the second corner; wherein the first end is curvilinear in shape at the intersection with the first linkspan and the second end is curvilinear in shape at the intersection with the second linkspan.

The gas interface module frame has at least two spaced apart levels with spaced apart docking stations disposed along each level, the refueling facility further comprising a plurality of fuel container assemblies adjacent the gas interface module, the fuel container assemblies stacked on top of one another and adjacent one another to form rows and columns of fuel container assemblies, with at least a portion of the fuel container assemblies fluidically coupled to the adjacent gas interface module.

The fuel container assemblies each comprise a frame to enable the fuel container assemblies to be stacked, and an elongated, cylindrical, double-walled, insulated fuel vessel at least approximately 6 meters in length and at least approximately 2 meters in width carried by the frame.

The first end of the deck extends beyond the elongated first side of the deck, forming an L-shaped extension of the upper deck surface.

A landing platform on which the fuel container assemblies and gas interface modules are mounted.

A gantry assembly; an articulating crane mounted on the gantry assembly, the articulating crane having a boom with a first end pivotally attached to the gantry assembly and a cargo engagement mechanism attached to the second end of the boom.

The gantry assembly comprises a first support leg system, a second support leg system spaced apart from the first support leg system, a bridge girder extending between the first and second support leg systems, wherein the articulating crane is mounted along the bridge girder.

The gantry assembly further comprises a sled slidably mounted on the bridge girder, wherein the articulating crane is pivotally mounted to the sled.

A track extending adjacent the fuel container assembly stack.

A track extending adjacent each side of the fuel container assembly stack.

A track extending adjacent each end of the elongated gas interface module.

The gantry assembly further comprises a guide mechanism mounted on a proximal end of each support leg assembly, each guide mechanism engaging a separate track.

The articulating crane comprises a rotatable base, a first arm having a first end pivotally attached to the base and a second end, and a second arm having a first end pivotally attached to the second end of the first arm and a second end, with a cargo engagement mechanism attached to the second end of the second arm.

The cargo engagement mechanism comprises an elongated base having a first end and a second end with a first gripper assembly at the first end of the elongated base and an opposing second gripper assembly at the second end of the elongated base.

The gas interface module frame is elongated and has at least two spaced apart levels with spaced apart docking stations disposed along each level.

The fuel container assemblies stacked on top of one another and adjacent one another to form rows and columns of fuel container assemblies together which form a fuel container assembly stack, with at least a portion of the fuel container assemblies of the fuel container assembly stack are fluidically coupled to the adjacent gas interface module.

Thus, a method for delivering gas to remote locations has been described. In one or more embodiments, gas delivery method may include filling a plurality of fuel container assemblies with a liquified gas at a first location; utilizing an articulating crane to move fuel container assemblies from a dock to the deck of a gas supply marine vessel; positioning the moved fuel container assemblies adjacent a gas interface module carried on the deck by stacking at least two fuel container assemblies on top of one another and adjacent at least two other stacked fuel container assemblies; fluidically connecting a plurality of lowermost fuel container assemblies in the stacked fuel container assemblies to the gas interface module; utilizing the gas supply marine vessel to move the stacked fuel container assemblies to a second location adjacent a shoreline; and utilizing the articulating crane to move unload at least a portion of the stacked fuel container assemblies from the deck of the gas supply marine vessel. In other embodiments, the gas delivery method may include filling a plurality of fuel container assemblies with a liquified gas at a first location; utilizing an articulating crane to move fuel container assemblies from a dock to the deck of a gas supply marine vessel; positioning the moved fuel container assemblies adjacent a gas interface module carried on the deck by stacking at least two fuel container assemblies on top of one another and adjacent at least two other stacked fuel container assemblies; fluidically connecting a plurality of lowermost fuel container assemblies in the stacked fuel container assemblies to the gas interface module; utilizing the gas supply marine vessel to move the stacked fuel container assemblies to a second location adjacent a shoreline; and fluidically coupling the gas interface module to a pipeline adjacent the second location; and pumping fuel from the fuel container assemblies through the gas interface module to the pipeline.

For any of the foregoing embodiments, the method may include any one of the following, alone or in combination with each other:

The gas is liquified natural gas.

The gas is liquefied petroleum gas.

The gas is compressed natural gas.

Placing the fuel container assemblies in a cargo cavity formed in the deck of the gas supply marine vessel.

Forming a stack of fuel container assemblies having at least two levels with and at least three rows.

Forming a stack of fuel container assemblies having at least three levels and at least three rows.

Forming a stack of fuel container assemblies having at least two levels with and at least five rows.

Forming a stack of fuel container assemblies having at least three levels and at least five rows.

Forming a stack of fuel container assemblies on either side of a gas interface module and fluidically coupling a plurality of fuel container assemblies in each stack to the gas interface module.

Utilizing a gantry assembly to translate the articulating crane along the deck above the stacked fuel container assemblies.

Utilizing the articulating crane to unload a fuel container assembly onto a cargo vehicle.

Utilizing the articulating crane to unload a fuel container assembly onto a floating dock.

Utilizing the articulating crane to unload a fuel container assembly onto a floating refueling facility.

The second location is a floating dock.

The second location is a floating refueling facility.

Utilizing the articulating crane to unload an empty fuel container assembly from a cargo vehicle onto the deck of the gas supply marine vessel.

Utilizing the articulating crane to form a stack of empty fuel container assemblies on the deck of the gas supply marine vessel.

Utilizing the articulating crane to move a plurality of empty fuel container assemblies from the floating refueling facility onto the deck of the gas supply marine vessel.

Utilizing the articulating crane to replace empty fuel container assemblies on the floating refueling facility with fuel container assemblies from the deck of the gas supply marine vessel.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

The invention claimed is:

1. A gas supply marine vessel comprising:
   a buoyant, elongated hull with a first hull side and an opposing second hull side, a first hull end and a second hull end;
   an upper deck extending between the first and second hull sides with an elongated cargo area defined along the upper deck between the first and second hull sides;
   one or more gas interface modules positioned in the elongated cargo area, each gas interface module having an elongated frame extending across the elongated cargo area between the first and second hull sides, the elongated frame having a first frame side and a second frame side and at least two spaced apart, horizontal levels with each level having a substantially horizontal access walkway positioned between the two frame sides;
   a plurality of spaced apart fuel vessel docking stations disposed along a length of at least one of the first or second frame sides; and
   a plurality of fuel container assemblies disposed along at least one frame side of each gas interface module and extending perpendicularly away from said gas interface module, the plurality of fuel container assemblies arranged in a plurality of columns adjacent one another, whereby each column comprises at least a first fuel container assembly stacked on top of a second fuel container assembly, with at least a first portion of the plurality of fuel container assemblies fluidically coupled to the fuel vessel docking stations of at least one gas interface module along at least one of the frame sides and at least one of the frame levels, each fuel container assembly comprising a fuel container frame supporting an ISO tank container.

2. The gas supply marine vessel of claim 1, wherein a second portion of the plurality of fuel container assemblies are fluidically decoupled from the at least one gas interface module.

3. The marine vessel of claim 1, further comprising a movable base assembly positioned adjacent the elongated cargo area, the movable base assembly axially movable along at least a portion of the length of the elongated hull; and a pivotable crane assembly mounted on the movable base assembly, the pivotable crane assembly having a boom with a first end and a second end, the first end of the boom pivotally attached to the movable base assembly and a cargo engagement mechanism attached to the second end of the boom.

4. The marine vessel of claim 3, wherein the movable base assembly is a gantry assembly with a first support leg system, a second support leg system spaced apart from the first support leg system, and a bridge girder extending between the first and second support leg systems to permit the gantry assembly to straddle the elongated cargo area above the one or more gas interface modules, wherein the crane assembly is mounted on the bridge girder of the gantry assembly.

5. The gas supply marine vessel of claim 1, wherein the plurality of fuel container assemblies are physically attached to the gas interface module and the ISO tank containers of the first portion of the plurality of fuel container assemblies are fluidically coupled to the fuel vessel docking stations.

6. The gas supply marine vessel of claim 1, wherein the gas interface module further comprises one or more pumps carried by the elongated frame and in fluid communication with the first portion of the plurality of fuel container assemblies fluidically coupled to the at least one gas interface module.

7. A gas supply marine system comprising
   a buoyant, elongated hull with a first hull side and an opposing second hull side, a first hull end and a second hull end;
   an upper deck extending between the first and second hull sides with an elongated cargo area defined along the upper deck between the first and second hull sides;
   a first gas interface module positioned in the elongated cargo area and a second gas interface module positioned in the elongated cargo area and spaced apart from the first gas interface module, each gas interface module having an elongated frame extending across the elongated cargo area between the first and second hull sides, the elongated frame having a first frame side and a second frame side and at least two spaced apart, horizontal levels with each level having a substantially horizontal access walkway positioned between the two frame sides;
   a plurality of fuel vessel docking stations disposed along at least one frame side of each gas interface module, the plurality of fuel vessel docking stations spaced apart from one another horizontally and vertically; and
   a first row of side-by-side fuel container assemblies adjacent a frame side of each of the first and second gas interface modules, each fuel container assembly of the first row extending perpendicularly away from a respective adjacent gas interface module frame side, wherein at least a portion of the fuel container assemblies of the first row are fluidically coupled to an adjacent gas interface module by individual fuel vessel docking stations; and
   a second row of side-by-side fuel container assemblies adjacent a frame side of each of the first and second gas interface modules, each fuel container assembly of the second row extending perpendicularly away from a respective adjacent gas interface module frame side and stacked on top of a fuel container assembly of the first row.

8. The gas supply marine system of claim 7, wherein each fuel container assembly comprises a fuel container frame supporting an ISO tank container.

9. The gas supply marine system of claim 7, wherein the plurality of fuel container assemblies are physically attached to the gas interface module in addition to those fuel container assemblies that are also fluidically coupled to the gas interface module.

10. The gas supply marine system of claim 7, wherein each gas interface module further comprises one or more pumps carried by the elongated frame and in fluid communication with the fuel container assemblies fluidically coupled to the gas interface module.

11. The gas supply marine system of claim 7, wherein the elongated cargo area is a cargo cavity formed in the upper deck between the first and second hull sides and extending below the upper deck, and wherein each gas interface module comprises no more than six spaced apart, horizontal levels, with each level having a substantially horizontal access walkway positioned between the two frame sides, and with a larger number of levels of each gas interface module within the cargo cavity below the upper deck and a smaller number of levels of each gas interface module above the upper deck.

12. The gas supply marine system of claim 7, wherein the elongated cargo areas is a cargo cavity formed in the upper deck between the first and second hull sides and extending below the upper deck, and wherein the plurality of gas interface modules further includes a third gas interface module disposed in the cargo cavity and spaced apart from the first and second gas interface modules, wherein each of the first and second gas interface modules have at least three levels with a plurality of fuel vessel docking stations disposed along each frame side at each level; and wherein the plurality of fuel container assemblies comprises fuel container assemblies extending perpendicularly from each side of the first and second gas interface modules at each level, with at least a portion of the fuel container assemblies extending from each of the first and second gas interface modules fluidically coupled thereto.

13. The gas supply marine system of claim 12, wherein the first gas interface module, second gas interface module and third gas interface module are disposed in the cargo cavity with fuel container assemblies extending from one side of the first gas interface module adjacent fuel container assemblies extending from one side of the second gas interface module, and with fuel container assemblies extending from the other side of the second gas interface module adjacent fuel container assemblies extending from one side of the third gas interface module.

14. The gas supply marine system of claim 13, wherein each gas interface module comprises no more than six spaced apart, horizontal levels, with each level having a substantially horizontal access walkway positioned between the two frame sides, and with a larger number of levels of each gas interface module within the cargo cavity below the upper deck and a smaller number of levels of each gas interface module above the upper deck.

15. The gas supply marine system of claim 7, wherein the first hull end is the bow of a gas supply marine vessel and the second hull end is the stern of the gas supply marine vessel; the gas supply marine system further comprising a multi-deck, enclosed accommodation structure disposed at the bow of the gas supply marine vessel.

16. The gas supply marine system of claim 15, wherein the elongated cargo area is a cargo cavity formed in the upper deck with the gas interface modules disposed in the cargo cavity with at least the first row of side-by-side fuel container assemblies disposed in the cargo cavity adjacent the lower most level.

17. The gas supply marine system of claim 16, wherein the cargo cavity is open and uncovered.

18. The gas supply marine system of claim 15, wherein the gas supply marine system is a self-propelled boat.

19. The gas supply marine system of claim 15, wherein the gas supply marine system is a barge.

20. The gas supply marine system of claim 15, further comprising a floating refueling facility having a deck with an elongated first side, a second side and a third side with an upper deck surface extending between the sides; at least one float supporting the deck; at least one gas interface module disposed on the floating refueling facility, each gas interface module on the floating refueling facility having an elongated frame extending between a first end and a second end to define two spaced apart frame sides and at least two spaced apart, horizontal levels, with each level having a substantially horizontal access walkway positioned between the two frame sides; a plurality of fuel vessel docking stations disposed along at least one frame side of each gas interface module, the plurality of fuel vessel docking stations spaced apart from one another horizontally and vertically; wherein the gas supply marine vessel is docked adjacent the elongated first side of the floating refueling facility.

21. The gas delivery system of claim 20, wherein the at least one float supporting the deck is a barge.

22. A gas delivery method comprising filling a plurality of international Organization for Standardization (ISO) tank container assemblies positioned on a deck of a gas supply marine vessel with compressed gas at a first location; positioning a floating refueling facility at a second location; utilizing the gas supply marine vessel to transport the filled plurality of ISO tank container assemblies to the second location; and unloading the filled plurality of ISO tank container assemblies from the deck of the gas supply marine vessel, wherein unloading comprises bulk offloading a first portion of the plurality of ISO tank container assemblies on the gas supply marine vessel to the floating refueling facility and storing the offloaded compressed gas in fuel storage vessels on the floating refueling facility.

23. The gas delivery method of claim 22, wherein positioning a floating refueling facility comprises deploying a floating dock adjacent a shoreline location lacking on-shore gas storage facilities.

24. The gas delivery method of claim 22, further comprising installing a vehicle access linkspan between the floating refueling facility and the shoreline; and positioning a vehicle on the floating refueling facility to receive an ISO tank container assembly from the gas supply marine vessel.

25. The gas delivery method of claim 22, wherein unloading further comprises moving a second portion of the plurality of ISO tank container assemblies from the gas supply marine vessel to the floating refueling facility.

26. A gas delivery method comprising, at a first location, moving a plurality of international Organization for Standardization (ISO) tank container assemblies to a position adjacent a gas interface module installed on the deck of a gas supply marine vessel and securing the ISO tank container assemblies to the gas interface module for transport; fluidically coupling at least a portion of the plurality of the ISO tank container assemblies to the gas interface module; utilizing the gas supply marine vessel to transport the plurality of ISO tank container assemblies to a second location; and unloading the plurality of ISO tank container assemblies from the deck of the gas supply marine vessel, wherein unloading comprises bulk offloading a first portion of the plurality of ISO tank container assemblies on the gas supply marine vessel utilizing the gas interface module to which the ISO tank container assemblies are fluidically coupled.

27. The method of claim 26, further comprising filling first portion of the plurality of ISO tank container assemblies with compressed gas at the first location utilizing the gas interface module to which they are fluidically coupled.

28. The method of claim 26, further comprising detaching a second portion of the plurality of ISO tank container assemblies from the gas interface module at the second location; and utilizing a crane onboard the gas supply marine vessel to unload the second portion of the plurality of ISO tank container assemblies from the gas supply marine vessel.

29. The method of claim 26, wherein bulk offloading at the second location comprises discharging the first portion of the plurality of ISO tank container assemblies to the storage vessel of an adjacent ship.

30. The method of claim 26, wherein bulk offloading at the second location comprises discharging the first portion of the plurality of ISO tank container assemblies to the storage vessel of a floating refueling facility.

* * * * *